United States Patent
Xin et al.

(10) Patent No.: US 11,606,401 B2
(45) Date of Patent: Mar. 14, 2023

(54) METHOD FOR PROCESSING LIVE STREAMING DATA AND SERVER

(71) Applicant: BEIJING DAJIA INTERNET INFORMATION TECHNOLOGY CO., LTD., Beijing (CN)

(72) Inventors: Xing Xin, Beijing (CN); Yulong Zhou, Beijing (CN); Budi Zhao, Beijing (CN); Xinglu Zhao, Beijing (CN); Zhenduo Zhang, Beijing (CN); Bingqing Sun, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/534,842

(22) Filed: Nov. 24, 2021

(65) Prior Publication Data
US 2022/0294834 A1 Sep. 15, 2022

(30) Foreign Application Priority Data
Mar. 12, 2021 (CN) .......................... 202110269700.0

(51) Int. Cl.
| H04L 65/403 | (2022.01) |
|---|---|
| G06V 10/764 | (2022.01) |
| G06Q 30/0601 | (2023.01) |

(52) U.S. Cl.
CPC ....... *H04L 65/403* (2013.01); *G06Q 30/0621* (2013.01); *G06V 10/764* (2022.01)

(58) Field of Classification Search
CPC . H04L 65/403; G06V 10/764; G06Q 30/0621
See application file for complete search history.

(56) References Cited

U.S. PATENT DOCUMENTS

| 10,154,372 B1* | 12/2018 | Vltavsky | ............... H04W 4/021 |
|---|---|---|---|
| 2016/0180113 A1* | 6/2016 | Patton | ................ G06F 16/9535 |
| | | | 726/28 |

(Continued)

FOREIGN PATENT DOCUMENTS

| CN | 106101825 A | 11/2016 |
|---|---|---|
| CN | 106791517 A | 5/2017 |

(Continued)

OTHER PUBLICATIONS

The State Intellectual Property Office of People's Republic of China, First Office Action in Patent Application No. CN202110269700.0 dated Apr. 28, 2022, which is a foreign counterpart application corresponding to this U.S. Patent Application, to which this application claims priority.

(Continued)

*Primary Examiner* — Viet D Vu
(74) *Attorney, Agent, or Firm* — Koiitch Romano Dascenzo Gates LLC

(57) ABSTRACT

Provided is a method for processing live streaming data. The method is applicable to a server and includes receiving an article post request from a first terminal by the server, wherein the first terminal is a terminal corresponding to an anchor account, and the article post request carries a screenshot of a live streaming picture in a live streaming room of the anchor account, the screenshot of the live streaming picture including an article object; verifying the screenshot of the live streaming picture in response to the article post request; and sending verification failure information to the first terminal in response to a failure of the verifying for the screenshot of the live streaming picture, wherein the verification failure information indicates that the article object is not allowed to be posted.

16 Claims, 13 Drawing Sheets

(56) References Cited

U.S. PATENT DOCUMENTS

| | | | |
|---|---|---|---|
| 2017/0134406 A1 | 5/2017 | Guo et al. | |
| 2019/0297083 A1* | 9/2019 | Li | H04L 63/08 |
| 2019/0333117 A1* | 10/2019 | Lee | G06Q 20/10 |
| 2019/0372991 A1* | 12/2019 | Allen | H04L 51/52 |
| 2020/0128286 A1* | 4/2020 | Anders | H04N 21/23418 |
| 2021/0006864 A1 | 1/2021 | Xu et al. | |

FOREIGN PATENT DOCUMENTS

| | | |
|---|---|---|
| CN | 109670055 A | 4/2019 |
| CN | 111314721 A | 6/2020 |
| CN | 111652678 A | 9/2020 |
| CN | 112235647 A | 1/2021 |
| KR | 102048618 | 11/2019 |
| WO | 2018095142 A1 | 5/2018 |

OTHER PUBLICATIONS

European Patent Office, Extended European Search Report pursuant to Rule 62 EPC, dated May 19, 2022 in Patent Application No. 21210664.5, which is a foreign counterpart to this U.S. Application.

\* cited by examiner

METHOD FOR PROCESSING LIVE STREAMING DATA AND SERVER

This disclosure is based on and claims priority to Chinese Patent Application No. 202110269700.0, filed on Mar. 12, 2021, the disclosure of which is herein incorporated by reference in its entirety.

TECHNICAL FIELD

The present disclosure relates to the field of Internet technologies, and in particular, relates to a method for processing live streaming data and a server.

BACKGROUND

With the continuous development of live streaming and e-commerce, e-commerce live streaming has gradually emerged, and the forms of e-commerce live streaming have become more and more diversified. For example, during the live streaming, an anchor in an e-commerce live streaming room may capture a live streaming picture by triggering a terminal, take an article object in the captured live streaming picture as a new to-be-traded article object, and then post transaction information of the article object in the live streaming room, such that audiences may view or purchase the article object.

SUMMARY

The present disclosure provides a method for processing live streaming data and a server. The technical solutions of the present disclosure are as follows.

According to a first aspect of embodiments of the present disclosure, a method for processing live streaming data is provided. The method is applicable to a server and includes: receiving an article post request from a first terminal, wherein the first terminal is a terminal corresponding to an anchor account, and the article post request carries a screenshot of a live streaming picture in a live streaming room of the anchor account, the screenshot of the live streaming picture comprising an article object; verifying the screenshot of the live streaming picture in response to the article post request; and sending verification failure information to the first terminal in response to a failure of the verifying for the screenshot of the live streaming picture, wherein the verification failure information indicates that the article object is not allowed to be posted.

According to another aspect of embodiments of the present disclosure, a method for processing live streaming data is provided. The method is applicable to a first terminal and includes: acquiring a screenshot of a live streaming picture in response to a screenshot operation for the live streaming picture of a live streaming room based on an anchor account, wherein the screenshot of the live streaming picture comprises an article object; sending an article post request to a server based on the screenshot of the live streaming picture, wherein the article post request is configured to request a post of the article object in the screenshot of the live streaming picture; and displaying verification failure information in response to receiving the verification failure information, wherein the verification failure information indicates that the article object is not allowed to be posted, and the verification failure information is returned by the server based on the article post request.

According to another aspect of embodiments of the present disclosure, a server is provided. The server includes: one or more processors; and a memory configured to store one or more instructions executable by the one or more processors; wherein the one or more processors, when loading and executing the one or more instructions, are caused to perform the following processes: receiving an article post request from a first terminal, wherein the first terminal is a terminal corresponding to an anchor account, and the article post request carries a screenshot of a live streaming picture in a live streaming room of the anchor account, the screenshot of the live streaming picture comprising an article object; verifying the screenshot of the live streaming picture in response to the article post request; and sending verification failure information to the first terminal in response to a failure of the verifying for the screenshot of the live streaming picture, wherein the verification failure information indicates that the article object is not allowed to be posted.

According to another aspect of the embodiments of the present disclosure, a terminal is provided. The terminal includes: one or more processors; and a memory configured to store one or more instructions executable by the one or more processors; wherein the one or more processors, when loading and executing the one or more instructions, are caused to perform the following processes: capturing a screenshot of a live streaming picture in response to a screenshot operation for a live streaming picture of a live streaming room based on an anchor account, wherein the screenshot of the live streaming picture comprises an article object; sending an article post request to a server based on the screenshot of the live streaming picture, wherein the article post request is configured to request a post of the article object in the screenshot of the live streaming picture; and displaying verification failure information in response to receiving the verification failure information, wherein the verification failure information indicates that the article object is not allowed to be posted, and the verification failure information is returned by the server based on the article post request.

According to another aspect of embodiments of the present disclosure, a non-transitory computer-readable storage medium is provided. The non-transitory computer-readable storage medium stores one or more instructions therein, wherein the one or more instructions, when loaded and executed by a processor of a server, cause the server to perform the following processes: receiving an article post request from a first terminal, wherein the first terminal is a terminal corresponding to an anchor account, and the article post request carries a screenshot of a live streaming picture in a live streaming room of the anchor account, the screenshot of the live streaming picture comprising an article object; verifying the screenshot of the live streaming picture in response to the article post request; and sending verification failure information to the first terminal in response to a failure of the verifying for the screenshot of the live streaming picture, wherein the verification failure information indicates that the article object is not allowed to be posted.

According to another aspect of embodiments of the present disclosure, a non-transitory computer-readable storage medium is provided. The non-transitory computer-readable storage medium stores one or more instructions therein, wherein the one or more instructions, when loaded and executed by a processor of a terminal, cause the terminal to perform the following processes: acquiring a screenshot of a live streaming picture in response to a screenshot operation for a live streaming picture of a live streaming room based on an anchor account, wherein the screenshot of the live streaming picture comprises an article object; sending an article post request to a server based on the screenshot of the live streaming picture, wherein the article post request is configured to request a post of the article object in the screenshot of the live streaming picture; and displaying verification failure information in response to receiving the verification failure information, wherein the verification failure information indicates that the article object is not allowed to be posted, and the verification failure information is returned by the server based on the article post request.

DETAILED DESCRIPTION

Figure 1:
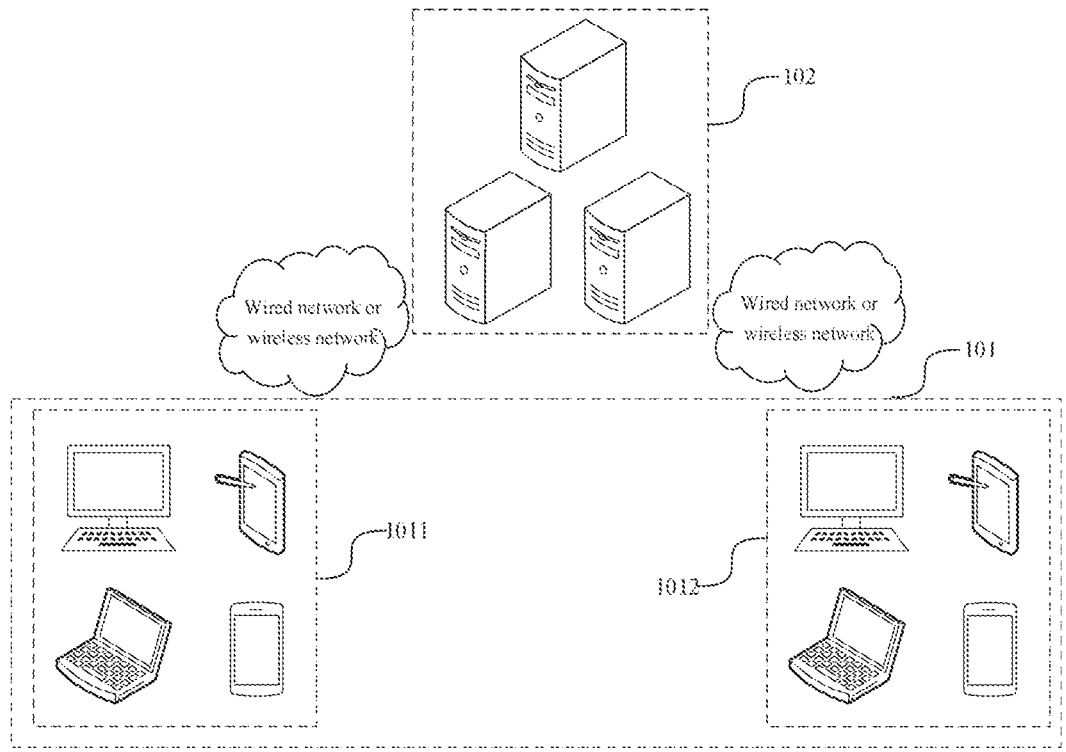
FIG. 1 is a schematic diagram of an implementation environment of a method for processing live streaming data according to an exemplary embodiment of the present disclosure.

FIG. 1 is a schematic diagram of an implementation environment of a method for processing live streaming data according to an embodiment of the present disclosure. Referring to FIG. 1, the implementation environment includes a terminal 101 and a server 102.

The terminal 101 is at least one of devices such as a smart phone, a smart watch, a desktop computer, a laptop computer, a virtual reality terminal, an augmented reality terminal, a wireless terminal, and a laptop portable computer. The terminal 101 has a communication function and can access a wired network or a wireless network. The terminal 101 generally refers to one of a plurality of terminals. This embodiment is illustrated only with the terminal 101 as an example. A person skilled in the art may know that the number of the aforementioned terminals 101 may be more or less.

The terminal 101 runs an application program with a live streaming function. The terminal 101 may include a first terminal 1011 and a second terminal 1012. The first terminal 1011 refers to a terminal corresponding to an anchor account. In the embodiments of the present disclosure, the first terminal 1011 is configured to acquire a screenshot of a live streaming picture by capturing a live streaming picture of a live streaming room of an anchor account in response to a screenshot operation of the anchor account in the live streaming room; send an article post request to a server based on the screenshot of the live streaming picture; and display verification failure information in response to receiving the verification failure information from the server based on the article post request. The second terminal 1012 refers to a terminal corresponding to any audience account in the live streaming room. In the embodiments of the present disclosure, the second terminal 1012 is configured to display transaction information of an article object in the live streaming room in response to a success of the verifying, and generate a transaction order in response to a transaction operation based on the transaction information.

The server 102 is an independent physical server, a server cluster or a distributed file system composed of a plurality of physical servers, or a cloud server that provides cloud services, cloud databases, cloud computing services, cloud functions, cloud storage services, network services, cloud communications, middleware services, domain name services, security services, content delivery network (CDN), as well as big data, artificial intelligence platforms, and other basic cloud computing services. The server 102 and the terminal 101 are directly or indirectly connected through wired or wireless communication, which is not limited in the embodiments of the present disclosure. Optionally, the number of the aforementioned servers 102 may be more or less, which is not limited in the embodiments of the present disclosure. In addition, the server 102 also includes other functional servers to provide more comprehensive and diversified services.

The server 102 is a background server of an application program with a live streaming function. In the embodiments of the present disclosure, the server 102 receives an article post request from the first terminal 1011; verifies the screenshot of the live streaming picture; and sends verification failure information to the first terminal 1011 in the case that the verifying for the screenshot of the live streaming picture fails.

Figure 2:
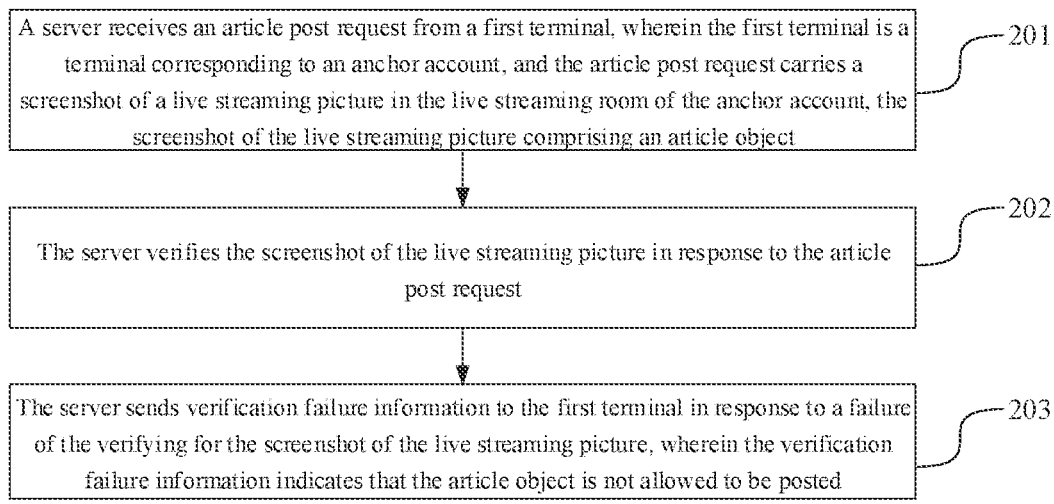
FIG. 2 is a flowchart of a method for processing live streaming data according to an exemplary embodiment of the present disclosure.

FIG. 2 is a flowchart of a method for processing live streaming data according to an exemplary embodiment of the present disclosure. Referring to FIG. 2, this method is applicable to a server and includes the following processes.

In 201, the server receives an article post request from a first terminal, wherein the first terminal is a terminal corresponding to an anchor account, and the article post request carries a screenshot of a live streaming picture in a live streaming room of the anchor account, the screenshot of the live streaming picture including an article object.

In 202, the server verifies the screenshot of the live streaming picture in response to the article post request.

In 203, the server sends verification failure information to the first terminal in response to a failure of the verifying for the screenshot of the live streaming picture, wherein the verification failure information indicates that the article object is not allowed to be posted.

In the embodiments of the present disclosure, prior to posting the screenshot of the live streaming picture, the screenshot of the live streaming picture is verified to determine whether the article object in the screenshot of the live streaming picture is allowed to be posted, such that only the article object that is successfully verified is posted. In this way, it can be ensured that the posted article object is successfully verified, and thus the security of subsequent article transactions can be ensured.

Figure 3:
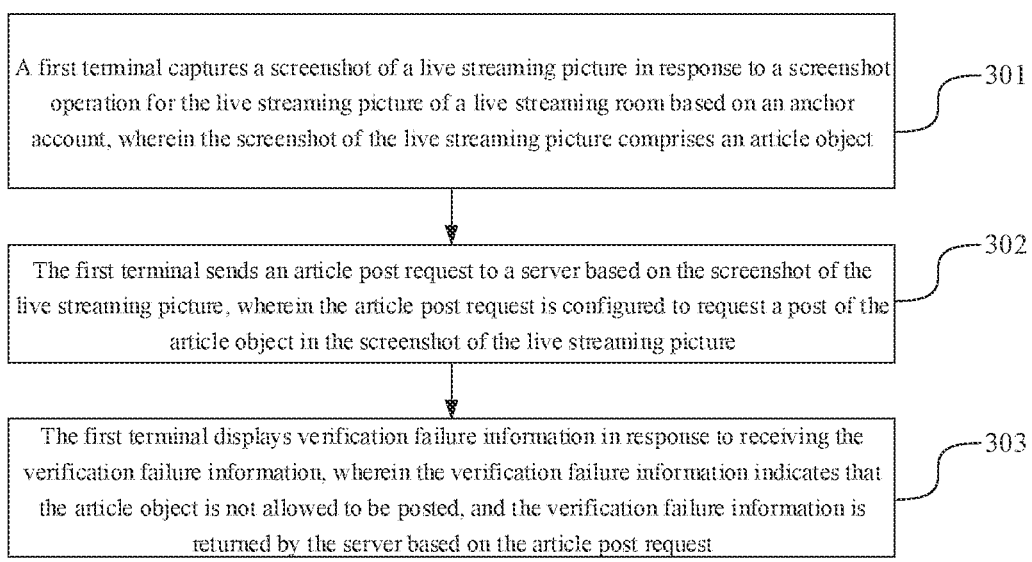
FIG. 3 is a flowchart of a method for processing live streaming data according to an exemplary embodiment of the present disclosure.

FIG. 3 is a flowchart of a method for processing live streaming data according to an exemplary embodiment. As shown in FIG. 3, this method is applicable to a first terminal and includes the following processes.

In 301, the first terminal captures a screenshot of a live streaming picture in response to a screenshot operation for the live streaming picture of a live streaming room based on an anchor account, wherein the screenshot of the live streaming picture includes art article object.

In 302, the first terminal sends an article post request to a server based on the screenshot of the live streaming picture, wherein the article post request is configured to request a post of the article object in the screenshot of the live streaming picture.

In 303, the first terminal displays verification failure information in response to receiving the verification failure information, wherein the verification failure information indicates that the article object is not allowed to be posted.

In the embodiments of the present disclosure, prior to posting the screenshot of the live streaming picture, the screenshot of the live streaming picture is verified to determine whether the article object in the screenshot of the live streaming picture is allowed to be posted, such that only the article object allowed to be posted is posted and the article object not allowed to be posted is not posted. In this way, the article object that is not allowed to be posted cannot be posted and the security of the article transaction can be ensured.

Figure 4:
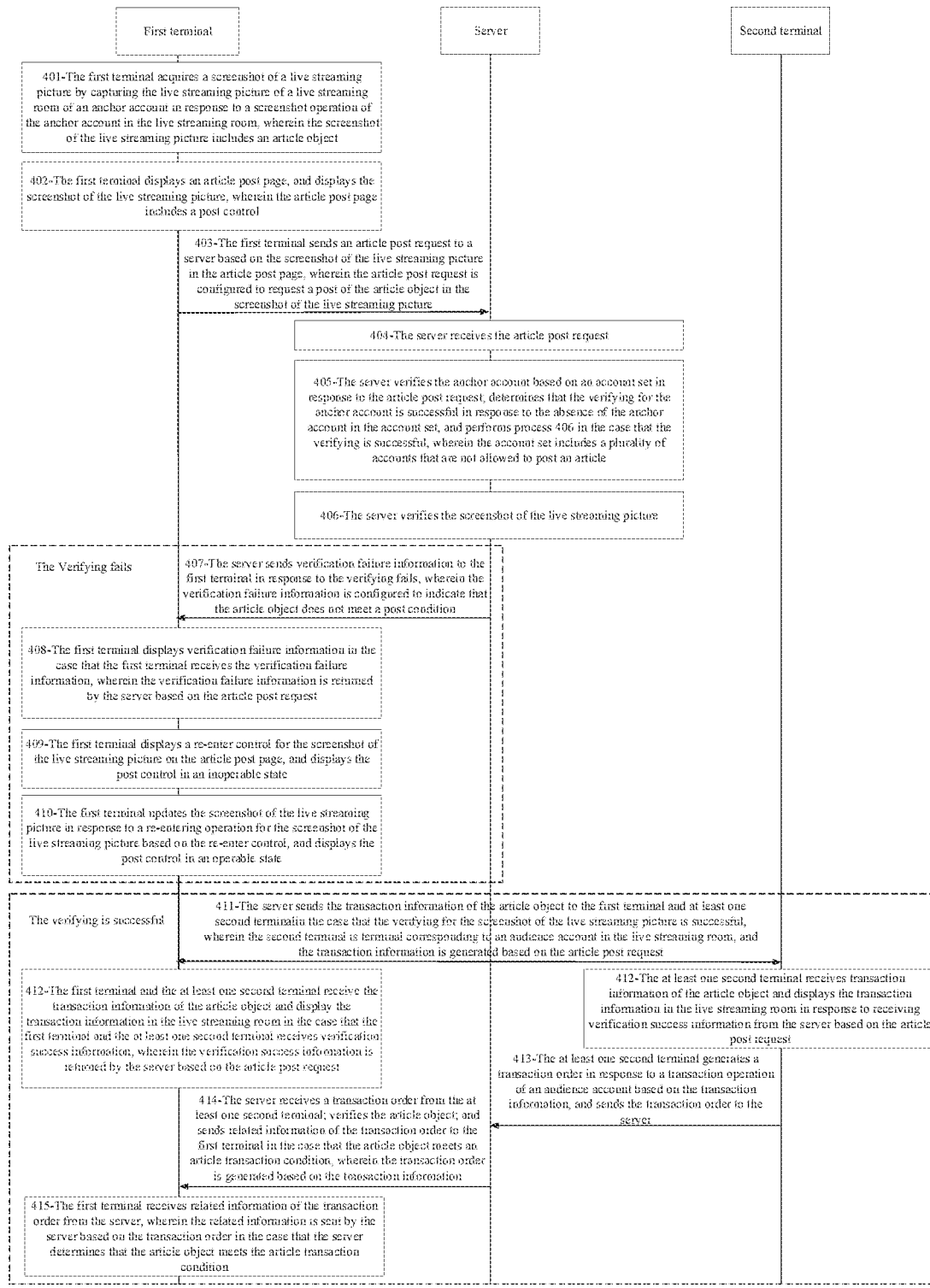
FIG. 4 is a flowchart of a method for processing streaming data according to an exemplary embodiment of the present disclosure.

FIG. 2 and FIG. 3 only illustrate the basic flow of embodiments of the present disclosure. The schemes provided by the embodiments of the present disclosure are further illustrated below based on a specific implementation. FIG. 4 is a flowchart of a method for processing live streaming data according to an exemplary embodiment. In this embodiment, the scheme is described by taking an interaction process of a first terminal, a second terminal, and a server as an example. Referring to FIG. 4, the method includes the following processes.

In 401, the first terminal acquires a screenshot of a live streaming picture by capturing a live streaming picture of a live streaming room of an anchor account in response to a screenshot operation in the live streaming room based on the anchor account, wherein the screenshot of the live streaming picture includes an article object.

That is, the first terminal acquires the screenshot of the live streaming picture based on the screenshot operation of the anchor account for the live streaming picture of the live streaming room. The article object refers to a to-be-traded article object (e.g., a commodity) in the live streaming room.

In some embodiments, an article post control is displayed on a live streaming room. The first terminal acquires the screenshot of the live streaming picture in response to a click operation for the article post control.

In some embodiments, the first terminal is provided with a screenshot button. The first terminal acquires the screenshot of the live streaming picture in response to a press operation for the screenshot button.

In 402, the first terminal displays an article post page, wherein the article post page includes a post control, and displays the screenshot of the live streaming picture.

Figure 5:
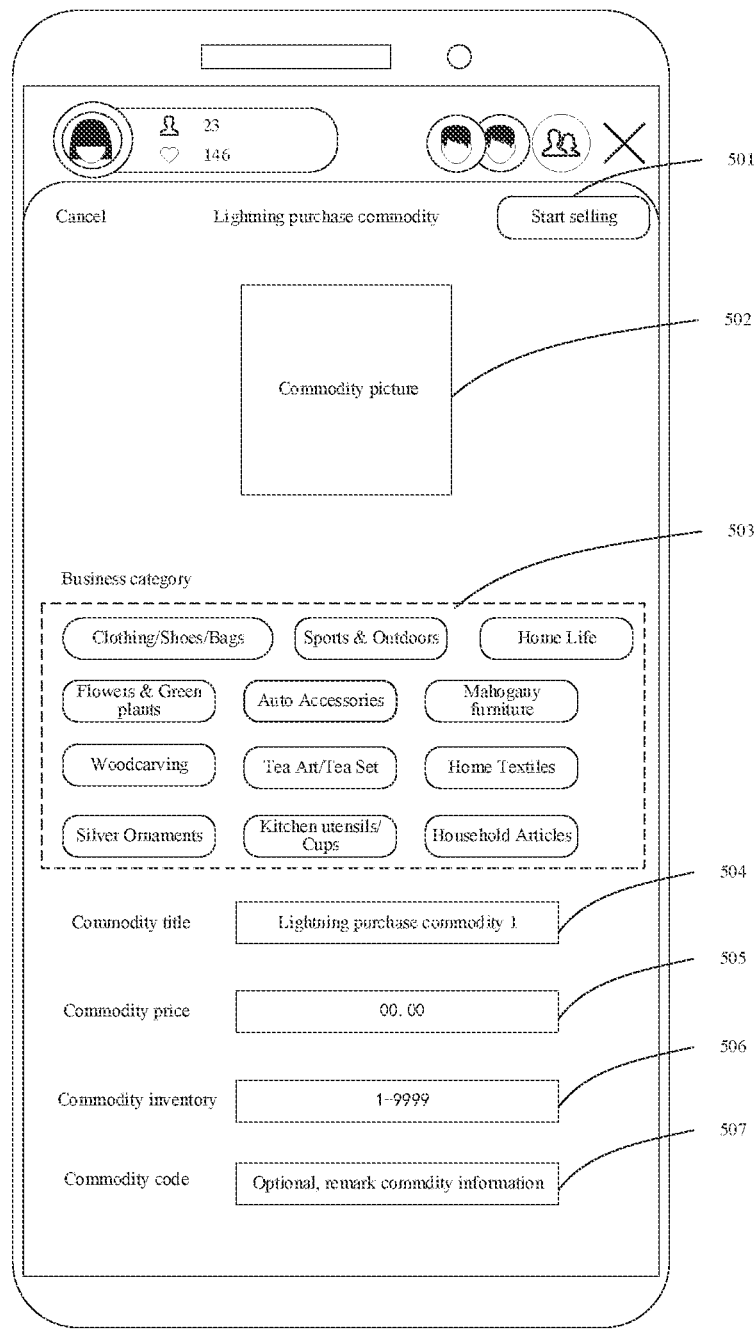
FIG. 5 is a schematic diagram of an article post page according to an exemplary embodiment of the present disclosure.

In the embodiments of the present disclosure, the screenshot operation is also configured to trigger the display of the article post page. The post control is configured to post the article object in the screenshot of the live streaming picture. For example, FIG. 5 is a schematic diagram of an article post page according to an exemplary embodiment. Referring to FIG. 5, the post control is a "start selling" control 501 shown in FIG. 5.

In some embodiments, the first terminal displays the article post page on the live streaming room in response to the screenshot operation, and displays the screenshot of the live streaming picture in the article post page. Referring to FIG. 5, the screenshot of the live streaming picture is displayed in a "commodity picture" area 502 shown in FIG. 5. In this embodiment, the article post page is displayed in the live streaming room, such that the anchor can perform live streaming without switching any pages, which ensures the coherency of the live streaming.

In some embodiments, the article post page also includes at least one article category. In response to a selection operation on any article category in the at least one article category, the first terminal determines the selected article category as an article category to which the article object in the screenshot in the live streaming picture belongs. The article category refers to the category to which the article object belongs. Referring to FIG. 5, the article category is a "business category" 503 shown in FIG. 5. The article category includes clothing, shoes, bags, sports & outdoors, and the like. It should be understood that the article category may include a first-level category, a second-level category, a third-level category, or the like, in which the second-level category belongs to the first-level category, the third-level category belongs to the second-level category, and so on. For example, kitchen appliances correspond to the first-level article category, kitchen utensils and cups correspond to the second-level article category. Optionally, the first terminal, in response to a selection operation on any article category, displays lower-level article categories in this article category; and then, in response to a selection operation on any lower-level article category, determines the selected article category as the article category to which the article object belongs. In this embodiment, the anchor sets up a multi-level article category, which not only facilitates the process of subsequent article. object verification, but also increases the amount of information when the article object is subsequently posted. For example, the anchor selects a three-level article category.

In some embodiments, the article post page also includes at least one article information input control. The at least one article information input control includes at least one of an article title input control, an article price input control, an article inventory input control, and an article code input control. Referring to FIG. 5, the article title input control is a "commodity title" control 504 shown in FIG. 5; the article price input control is a "commodity price" control 505 shown in FIG. 5; the article inventory input control is a "commodity inventory" control 506 shown in FIG. 5; and the article code input control is a "commodity code" control

507 shown in FIG. 5. In this embodiment, the anchor may set article inventory, article price, and other article information through the article information input control, which increases the amount of information when the article object is subsequently posted.

It should be noted that the process 402 is optional. In the above embodiments, the first terminal, in response to the screenshot operation, displays the article post page while capturing the screenshot of the live streaming picture, and then performs the subsequent post process of the article object based on the article post page. In some other embodiments, after capturing the screenshot of the live streaming picture, the first terminal sends the article post request to the server based on the screenshot of the live streaming picture, and then performs the subsequent post process of the article object.

In 403, the first terminal sends the article post request to the server based on the screenshot of the live streaming picture in the article post page, wherein the article post request is configured to request a post of the article object in the screenshot of the live streaming picture.

The article post request carries the anchor account and the screenshot of the live streaming picture. Optionally, the article post request also carries article information on the article post page, such as an article title, an article price, an article inventory, an article code, and the like of the article object in the screenshot of the live streaming picture.

In some embodiments, the first terminal requests the server to post the article object in the screenshot of the live streaming picture by sending the article post request to the server in response to a trigger operation on the post control in the article post page.

In 404, the server receives the article post request.

In some embodiments, the server receives the article post request, and acquires the anchor account and the screenshot of the live streaming picture carried in the article post request from a specific field of the article post request.

Optionally, the server acquires article information in the article post page carried in the article post request from the specific field of the article post request.

In 405, the server verifies the anchor account based on an account set in response to the article post request; determines that the verifying for the anchor account is successful in response to the absence of the anchor account in the account set; and performs process 406, wherein the account set includes a plurality of accounts that have no permission to post an article.

The account set is a set of accounts that have no permission to post an article. The account set may be understood as an account blacklist. Optionally, the account set includes accounts that the permission is not given to post an article within a period; or the account set includes accounts that the permission is not given to post an article permanently. In this embodiment, whether the anchor account is an account that has no permission to post an article is verified based on the account set, which can ensure that the anchor account is an account that has a permission to post at least one article, and further ensure the security of subsequent article transactions.

The process 405 is a process for determining that the verifying for the anchor account is successful. In some other embodiments, the server determines that the verifying fails in response to the presence of the anchor account in the account set, and then refuses to post the article object corresponding to the anchor account. Optionally, the server sends account prompt information to the first terminal, wherein the account prompt information indicates that the anchor account having no permission to post an article. In this embodiment, an account triggering the blacklist is refused to post an article object, which ensures that only an account having a permission to post at least one article can perform the subsequent operation of posting an article object, thereby ensuring the security of subsequent transactions.

It should be noted that the process 405 is optional. In the above embodiment, after receiving the article post request, the server verifies the anchor account, and then performs a verification process in the subsequent process 406. In some other embodiments, after receiving the article post request, the server performs the verification process in the subsequent process 406, without verifying the anchor account.

In 406, the server verifies the screenshot of the live streaming picture.

Optionally, the process of verifying the screenshot of the live streaming picture by the server includes any of the following.

(1) In some embodiments, the server verifies whether the article object in the screenshot of the live streaming picture meets an article object post condition, the process of which includes: acquiring a first classification result of the screenshot of the live streaming picture; determining that the verifying for the screenshot of the live streaming picture is successful in the case that the first classification result indicates that the article object meets the article object post condition; and determining that the verifying for the screenshot of the live streaming picture fails in the case that the first classification result indicates that the article object does not meet the article object post condition.

The first classification result is configured to indicate whether the article object meets the article object post condition. The article object post condition is configured to verify whether the article object meets the post condition, that is, the article object post condition indicates a condition that article object allowed to be posted in the live streaming room needs to meet. For example, taking that the article object is a commodity and the post condition is the commodity is in compliance as an example, the article object post condition is configured to verify whether the commodity violates the regulations. In some embodiments, the article object meeting the article object post condition means that the article object is allowed to be sold, and is not promoted beyond an allowed scope. In some other embodiments, the article object meeting the article object post condition means that the screenshot of the live streaming picture is clear and unsheltered. For example, the article object in the screenshot of the live streaming picture is clear, and the article object is not sheltered.

In the above embodiments, whether the article object meets the article object post condition is verified, to ensure that the verifying is successful in the case that the article object meets the article object post condition, and then the subsequent posting process is performed, thereby ensuring that the posted article object meets the article object post condition and further ensuring the security of subsequent article transactions.

Optionally, acquiring the first classification result of the screenshot of the live streaming picture by the server includes: acquiring the first classification result of the screenshot of the live streaming picture by processing the screenshot of the live streaming picture using a first network model in response to inputting the screenshot of the live streaming picture into the first network model. Specifically, the server inputs the screenshot of the live streaming picture into the first network model, and picture features of the screenshot of the live streaming picture are extracted through a feature extraction layer of the first network model. Then, the picture features are input into a fully connected layer, and the first classification result of the screenshot of the live streaming picture is acquired by processing the picture features through the fully connected layer. The first network model is a binary neural network model and is configured to determine whether the article object in the screenshot of the live streaming picture meets the article object post condition. In this embodiment, whether the article object in the screenshot of the live streaming picture meets the article object post condition is verified by using the first network model, which not only improves the efficiency of article object verification, but also improves the accuracy of article object verification. Optionally, the first network model is trained based on a plurality of sample pictures and corresponding first sample labels, the first sample labels being configured to indicate whether article objects in the sample pictures meet the article object post condition. The corresponding training process includes: in one iteration process, acquiring a classification result of the plurality of sample pictures in response to inputting the plurality of sample pictures into an initial model; adjusting model parameters in the initial model based on the classification result of the plurality of sample pictures and the first sample labels corresponding to the plurality of sample pictures; and continuing next iteration by using the adjusted model parameters as the model parameters for the next iteration until the training meets a training condition, and then the model that meets the training condition serves as the first network model.

(2) In some embodiments, the server verifies whether the anchor account is the first account and whether the article category to which the article object belongs is a target category, the process of which includes: determining that the verifying is successful in response to the anchor account being the first account; acquiring a second classification result of the screenshot of the live streaming picture in response to the anchor account not being the first account; determining that the verifying is successful in response to the second classification result indicating that the article object does not belong to the target category; and determining that the verifying fails in response to the second classification result indicating that the article object belongs to the target category.

The first account refers to an account that has a permission to post an article, the permission to post the article being a permission to post an article object under the target category. For example, the first account is a base account. The target category is a category that can be posted by a specific account. For example, the target category is a jade category. Taking the jade category as an example, the first account is a jade base account. By setting the jade base account, the quality of an article object under the jade category can be ensured, and the transaction security of the jade category can further be ensured. The second classification result is configured to indicate whether the article object in the screenshot of the live streaming picture belongs to the target category.

That is, the server verifies whether the anchor account is the first account, and determines that the verifying for the anchor account is successful in response to the anchor account being the first account. At this time, the anchor account has a permission to post an article object under the target category, and the article object in the screenshot of the live streaming picture is allowed to be posted based on the anchor account no matter whether the article object belongs to the target category. Therefore, there is no need to verify whether the article category to which the article object belongs is the target category. In the case that the anchor account is not the first account, whether the article category to which the article object belongs is the target category needs to be verified. That is, the second classification result of the screenshot of the live streaming picture is acquired, and it is determined that the verifying for the screenshot of the live streaming picture is successful in response to the second classification result indicating that the article object does not belong to the target category. In this way, the article object not belonging to the target category is allowed to be posted based on the anchor account. In the case that the second classification result indicates that the article object belongs to the target category, it is determined that the verifying for the screenshot of the live streaming picture fails, such that the article object belonging to the target category is not allowed to be posted based on the anchor account.

In the above embodiments, whether the anchor account is the first account is verified firstly, and then whether the article object belongs to the target category is verified in response to the anchor account not being the first account, to ensure that the anchor account that posts the article object under the target category is an anchor account having a permission to post the article object under the target category and further ensure the security of subsequent article transactions.

In some other embodiments, the server verifies whether the article category of the article object belongs to the target category and then verifies whether the anchor account is the first account, the process of which includes: acquiring a second classification result of the screenshot of the live streaming picture; determining that the verifying is successful in response to the second classification result indicating that the article object does not belong to the target category; verifying whether the anchor account is the first account in response to the second classification result indicating that the article object belongs to the target category; determining that the verifying fails in response to the anchor account not being the first account; and determining that the verifying is successful in response to the anchor account being the first account.

That is, the server verifies whether the article category of the article object belongs to the target category. That is, the server acquires the second classification result of the screenshot of the live streaming picture. In the case that the second classification result indicates that the article object does not belong to the target category, the article object is allowed to be posted based on the anchor account no matter whether the anchor account being the first account or not, such that it is determined that the verifying for the screenshot of the live streaming picture is successful and there is no need to verify whether the anchor account is the first account. In the case that the second classification result indicates that the article object belongs to the target category, whether the anchor account is the first account needs to be verified. In response to the anchor account being the first account, the article object belonging to the target category is allowed to be posted based on the anchor account, that is, it is determined that the verifying for the screenshot of the live streaming picture is successful. In response to the anchor account not being the first account, the article object belonging to the target category is not allowed to be posted based on the anchor account, that is, it is determined that the verifying for the screenshot of the live streaming picture fads.

In the embodiments of the present disclosure, the verifying precedence order of the anchor account and the article category is not limited. In the embodiments of the present disclosure, in the case that the anchor account is not the first account and the second classification result indicates that the article object belongs to the target category, it is determined that the verifying for the screenshot of the live streaming picture fails. In the case that the anchor account is not the first account and the second classification result indicates that the article object does not belong to the target category, or in the case that the anchor account is the first account and the second classification result indicates that the article object belongs to the target category, or in the case that the anchor account is the first account and the second classification result indicates that the article object does not belong to the target category, it is determined that the verifying for the screenshot of the live streaming picture is successful.

Optionally, acquiring the second classification result of the screenshot of the live streaming picture by the server includes: acquiring the second classification result of the screenshot of the live streaming picture by processing the screenshot of the live streaming picture using a second network model in response to inputting the screenshot of the live streaming picture into the second network model. Specifically, the server inputs the screenshot of the live streaming picture into the second network model, and picture features of the screenshot of the live streaming picture are extracted through a feature extraction layer of the second network model. Then, the picture features are input into a fully connected layer, and the second classification result of the screenshot of the live streaming picture is acquired by processing the picture features through the fully connected layer. The second network model is a binary neural network model. The second network model is configured to determine whether the article object in the screenshot of the live streaming picture belongs to the target category. In this embodiment, whether the article object in the screenshot of the live streaming picture belongs to the target category is verified by using the second network model, which not only improves the efficiency of article object verification, but also improves the accuracy of article object verification. Optionally, the second network model is trained based on a plurality of sample pictures and corresponding second sample labels, the second sample labels being configured to indicate whether article objects in the sample pictures belong to the target category. The corresponding training process includes: in one iteration process, acquiring a classification result of the plurality of sample pictures in response to inputting the plurality of sample pictures into an initial model; adjusting model parameters in the initial model based on the classification result of the plurality of sample pictures and the second sample labels corresponding to the plurality of sample pictures; and continuing next iteration by using the adjusted model parameters as model parameters for the next iteration until the training meets a training condition, and then the model that meets the training condition serves as the second network model.

(3) In some embodiments, the article post request carries a first article category. The server verifies whether the first article category matches a second article category to which the article object belongs, the process of which includes: acquiring a third classification result of the screenshot of the live streaming picture, wherein the third classification result is configured to indicate the second article category to which the article object in the screenshot of the live streaming picture belongs; determining that the verifying for the screenshot of the live streaming picture is successful in the case that the first article category matches the second article category; and determining that the verifying for the screenshot of the live streaming picture fails in the case that the first article category does not match the second article category.

The first article category refers to an article category set by the anchor account. In some embodiments, the first article category is determined based on a selection operation of the anchor account on the article category in the process 402.

In the above embodiments, whether the second article category to which the article object belongs is the same as the first article object carried by the article post request is verified to ensure that the article category of the posted article object is set correctly, thereby ensuring the security of subsequent article transactions.

Optionally, acquiring the third classification result of the screenshot of the live streaming picture by the server includes: acquiring the third classification result of the screenshot of the live streaming picture by processing the screenshot of the live streaming picture using a third network model in response to inputting the screenshot of the live streaming picture into the third network model. Specifically, the server inputs the screenshot of the live streaming picture into the third network model, and picture features of the screenshot of the live streaming picture are extracted through a feature extraction layer of the third network model. Then, the picture features are input into a fully connected layer, and the third classification result of the screenshot of the live streaming picture is acquired by processing the picture features through the fully connected layer. The third network model is a multi-class neural network model. The third network model is configured to determine the second article category to which the article object in the screenshot, of the live streaming picture belongs. In this embodiment, whether the second article category to which the article object belongs is the same as the first article category carried by the article post request is verified by using the third network model, which not only improves the efficiency of article object verification, but also improves the accuracy of article object verification. Optionally, the third network model is trained based on a plurality of sample pictures and corresponding third sample labels, the third sample labels being configured to indicate an article category to which article objects in the sample pictures belong. The corresponding training process includes: in one iteration process, acquiring a classification result of the plurality of sample pictures in response to inputting the plurality of sample pictures into an initial model; adjusting model parameters in the initial model based on the classification result of the plurality of sample pictures and the third sample labels corresponding to the plurality of sample pictures; and continuing next iteration by using the adjusted model parameters as model parameters for the next iteration until the training meets a training condition, and then the model that meets the training condition serves as the third network model.

It should be noted that the server performs the verification process for the screenshot of the live streaming picture based on one or more of the above (1) to (3).

(4) In some embodiments, verifying the screenshot of the live streaming picture by the server includes: performing a first type of verification among three types of verification in response to the article post request; in the case that a first verification result indicates that the first verifying is successful, performing a second type of verification in response to the first verification result meeting a condition; and in the case that a second verification result indicates that the second verifying is successful, performing a third type of verification in response to the second verification result meeting a condition. The three types of verification include: verifying whether the article object in the screenshot of the live streaming picture meets the article object post condition; verifying whether the anchor account is the first account and whether the article category of the article object belongs to the target category; and verifying whether the first article category matches the second article category to which the article object belongs. In some embodiments, the server determines that the verifying fails in response to any one of the above three types of verification not matching a condition.

During the process of verifying whether the article object in the screenshot of the live streaming picture meets the article object post condition, it is determined that the corresponding verification result meets a condition in the case that the article object in the screenshot of the live streaming picture meets the article object post condition; and it is determined that the corresponding verification result does not meet a condition in the case that the article object in the screenshot of the live streaming picture does not meet the article object post condition. During the process of verifying whether the anchor account is the first account and whether the article category of the article object belongs to the target category, it is determined that the corresponding verification result meets a condition in the case that the anchor account is the first account or the article category of the article object does not belong to the target category; and it is determined that the corresponding verification result does not meet a condition in the case that the anchor account is not the first account and the article category of the article object belongs to the target category. During the process of verifying whether the first article category matches the second article category to which the article object belongs, it is determined that the corresponding verification result meets a condition in the case that the first article category matches the second article category; and it is determined that the corresponding verification result does not meet a condition in the case that the first article category does not match the second article category.

Optionally, the process of verifying the screenshot of the live streaming picture by the server includes any of the following.

In some embodiments, the server verifies whether the article object in the screenshot of the live streaming picture meets the article object post condition in response to the article post request; verifies whether the anchor account is the first account and whether the article category of the article object belongs to the target category in the case that the article object in the screenshot of the live streaming picture meets the article object post condition; and verifies whether the first article category matches the second article category to which the article object belongs in the case that the anchor account is the first account and the article category of the article object belongs to the target category.

In some embodiments, the server verifies whether the first article category matches the second article category to which the article object belongs in response to the article post request; verifies whether the article object in the screenshot of the live streaming picture meets the article object post condition in the case that the first article category matches the second article category to which the article object belongs; and verifies whether the anchor account is the first account and whether the article category of the article object belongs to the target category in the case that the article object in the screenshot of the live streaming picture meets the article object post condition.

The embodiments of the present disclosure are illustrated only taking the above two verification sequences as an example. In another embodiment, the verifications can be performed in other sequences. In the embodiments of the present disclosure, the performing precedence order of the three types of verification is not limited.

In some embodiments, each type of verification is provided with a corresponding priority. According to the priority, the three types of the verification are divided into the first type of verification, the second type of verification, and the third type of the verification, wherein the verification with the highest priority serves as the first type of verification. The first type of verification is performed in response to the article post request. In the case that the first verification result indicates that the first verifying fails, other types of verification are not performed, and it is determined that the verifying for the screenshot of the live streaming picture fails. In the case that the first verification result indicates that the first verifying is successful, the second type of verification with a relatively high priority is performed. In the case that the second verification result indicates the second verifying fails, the third type of verification is not performed and it is determined that the verifying for the screenshot of the live streaming picture fails. In the case that the second verification result indicates the second verifying is successful, the third type of verification with a lowest priority is performed. In the case that the third verification result indicates that the third verifying fails, it is determined that the verifying for the screenshot of the live streaming picture fails. In the case that the third verification result indicates that the third verifying is successful, it is determined that the verifying for the screenshot of the live streaming picture is successful.

Figure 6:
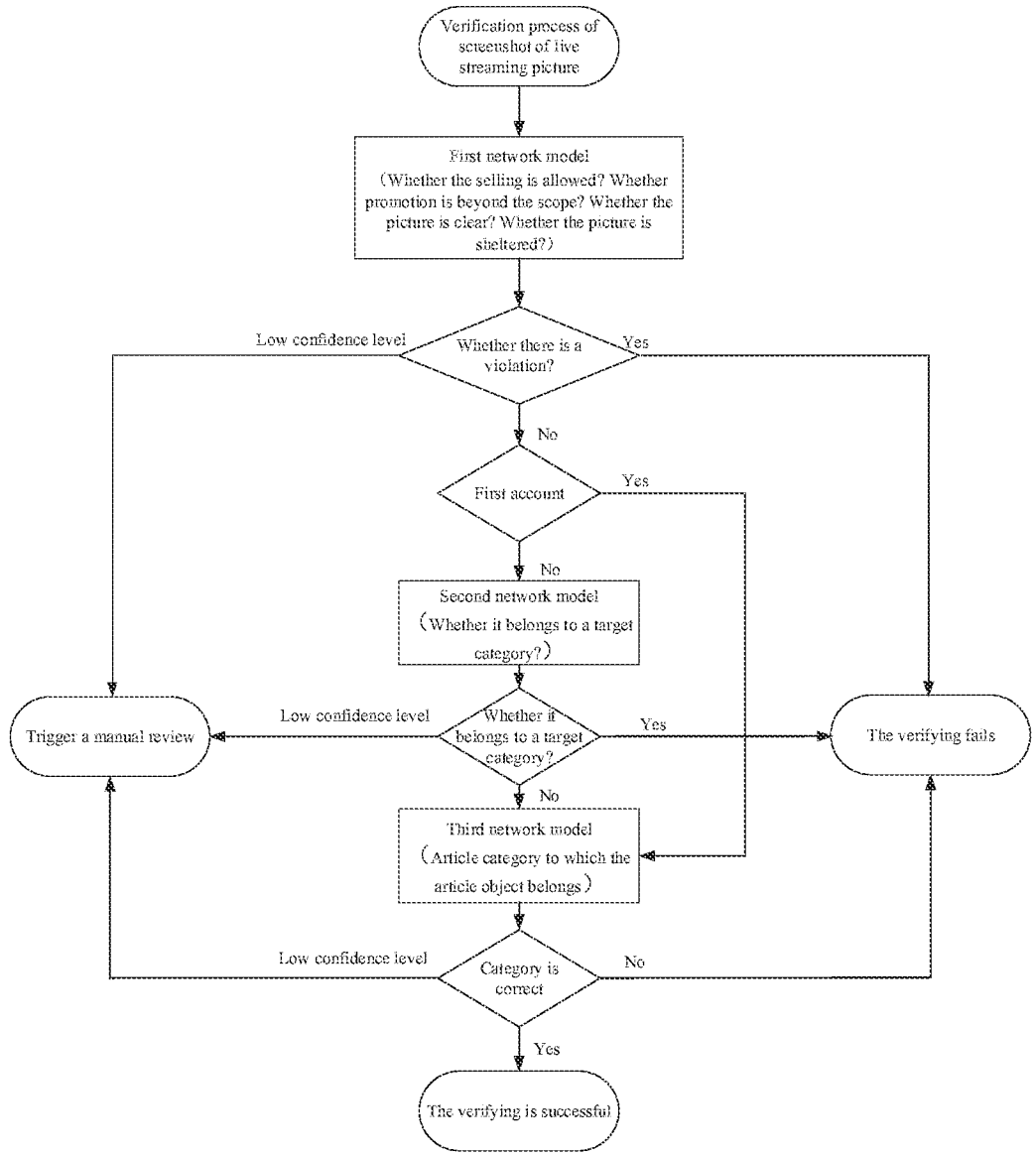
FIG. 6 is a flowchart of verification for a screenshot of a streaming picture according to an exemplary embodiment of the present disclosure.

Exemplarily, FIG. 6 is a flowchart of verification for a screenshot of a live streaming picture according to an exemplary embodiment. The method illustrated in FIG. 6 may be implemented by a server. Referring to FIG. 6, after acquiring the screenshot of the live streaming picture, the verification process of the screenshot of live streaming picture starts. The server verifies whether an article object in the screenshot of the live streaming picture meets an article object post condition (e.g., whether a commodity violates the regulations) based on a first network model. In the case that the article object in the screenshot of the live streaming picture does not meet the article object post condition (e.g., the commodity violates the regulations), it is determined that the verifying for the screenshot of the live streaming picture fails. In the case that the article object in the screenshot of the live streaming picture meets the article object post condition (i.e., the commodity does not violate the regulations), the method continues to verify whether an anchor account is a first account. In the case that the anchor account is the first account, it is determined that the verifying for the anchor account is successful. In the case that the anchor account is not the first account, the method continues to verify whether the article object in the screenshot of the live streaming picture belongs to a target category based on a second network model. In the case that the article object in the screenshot of the live streaming picture belongs to the target category, it is determined that the verifying for the screenshot of the live streaming picture fails. In the case that the article object in the screenshot of the live streaming picture does not belong to the target category, or in the case that the verifying for the anchor account is successful, the method continues to verify whether the article category to which the article object belongs is correct based on a third network model. In the case that the article category to which the article object belongs is correct, it is determined that the verifying for the screenshot of the live streaming picture is successful. In the case that the article category to which the article object belongs is not correct, it is determined that the verifying for the screenshot of the live streaming picture fails.

In the above embodiments, the screenshot of the live streaming picture is comprehensively verified by sequentially performing the first type of verification, the second type of verification, and the third type of verification among the three types of verification, which improves the accuracy and comprehensiveness of the verification and further ensures the security of article transactions.

In some embodiments, the server generates a confidence level for the verification result. For example, as shown in FIG. 6, the server generates a confidence level of a first classification result (e.g., the result from the determination on whether there is a violation), and a manual review is triggered in the case that the confidence level is less than or equal to a target threshold; or, the server generates a confidence level of a second classification result (e.g., result from the second network model), and a manual review is triggered in the case that the confidence level is less than or equal to a target threshold; or, the server generates a confidence level of a category matching result (e.g., result from the determination on whether the first article category matches a second article category to which the article object belongs), and a manual review is triggered in the case that the confidence level is less than or equal to a target threshold. The confidence level indicates the reliability of the classification result or the matching result. The target threshold is a predetermined confidence level threshold. The manual review is triggered in response to a low confidence level, which ensures the accuracy of verification.

In some embodiments, any network model used in the method for processing live streaming data is acquired by transfer learning based on a ResNet50x1 pre-trained model. Optionally, prior to performing the present disclosure, the server transfers the ResNet50x1 pre-trained model pre-trained based on an ImageNet-21k data set (a computer vision standard data set) to an article object verification scene, and trains the ResNet50x1 pre-trained model based on training data of the article object verification scene, to acquire the first network model, the second network model, or the third network model. Specifically, after acquiring the training data of the article object verification scheme, the server extracts a plurality of sample pictures in the training data and sample labels corresponding to the plurality of training samples. In one iteration process, a classification result of this iteration process is acquired in response to inputting the plurality of sample pictures into the ResNet50x1 pre-trained model respectively. Model parameters of the ResNet50x1 pre-trained model are adjusted based on the classification result of this iteration process and the sample labels, to acquire model parameters of the ResNet50x1 pre-trained model after this iteration. The next iteration process is performed based on the updated model parameters until the training meets a training condition. The trained model serves as a network model for use in the embodiments of the present disclosure. In the embodiments of the present disclosure, a network model with higher classification accuracy is acquired by using a transfer learning method to train the ResNet50x1 pre-trained model, thereby improving the accuracy of article object verification.

It should be noted that the process 405 may be optionally performed before or after the process 406, or the process 405 and the process 406 may be performed at the same time. The performing sequence of the process 405 and the process 406 is not limited in the embodiments of the present disclosure.

Based on the verification result in the process 406, the server performs different processes in response to the failure of the verifying for the screenshot of the live streaming picture or the success of the verifying for the screenshot of the live streaming picture. The corresponding process of the server in response to the failure of the verifying may refer to process 407 to process 410. The corresponding process of the server in response to the success of the verifying for the screenshot of the live streaming picture may refer to process 411 to process 415.

In 407, the server sends verification failure information to the first terminal in the case that the verifying for the screenshot of the live streaming picture fails, wherein the verification failure information indicates that the article object does not meet a post condition. That is, the verification failure information indicates that the article object is not allowed to be posted.

In 408, the first terminal displays the verification failure information in the case that the first terminal receives the verification failure information, wherein the verification failure information is returned by the server based on the article post request.

In some embodiments, the first terminal displays a verification prompt window in the article post page in the case that the first terminal receives the verification failure information, and displays the verification failure information in the verification prompt window.

Figure 7:
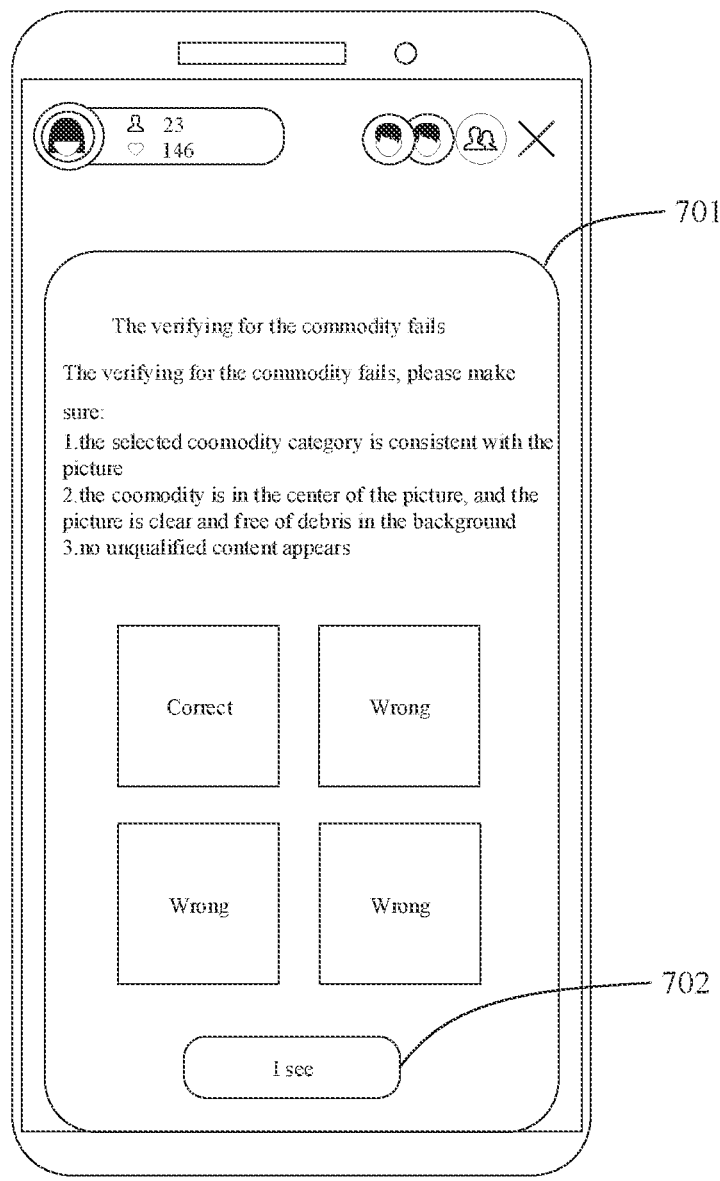
FIG. 7 is a schematic diagram of displaying verification failure information according to an exemplary embodiment of the present disclosure.

For example, FIG. 7 is a schematic diagram of displaying verification failure information according to an exemplary embodiment. Referring to FIG. 7, the verification prompt window is a prompt window 701 shown in FIG. 7; the verification failure information is "commodity review failure information" in the prompt window 701; the content of the verification failure information is "the verifying for the commodity fails, please make sure: the selected commodity category is consistent with the picture; the commodity is in the center of the picture, and the picture is clear and free of debris in the background; no unqualified content appears."

Optionally, the verification failure information is further configured to prompt the anchor account to re-enter the screenshot of the live streaming picture, wherein the re-entered screenshot of the live streaming picture is different from the previous screenshot of the live streaming picture. Correspondingly, the following implementations may also be performed by the first terminal based on the verification failure information, referring to process 409 to process 410.

In 409, the first terminal displays a re-enter control for a screenshot of a live streaming picture on the article post page, and displays the post control in an inoperable state.

In some embodiments, the first terminal closes the verification failure information in response to a closing operation on the verification failure information. In this case, the re-enter control for the screenshot of the live streaming picture is displayed on the article post page. The post control is displayed in an inoperable state, which means that the article object can't be posted currently. The closing operation is a triggering operation on a closing control in the verification prompt window. Referring to FIG. 7, the closing control is an "I see" control 702 shown in FIG. 7.

Figure 8:
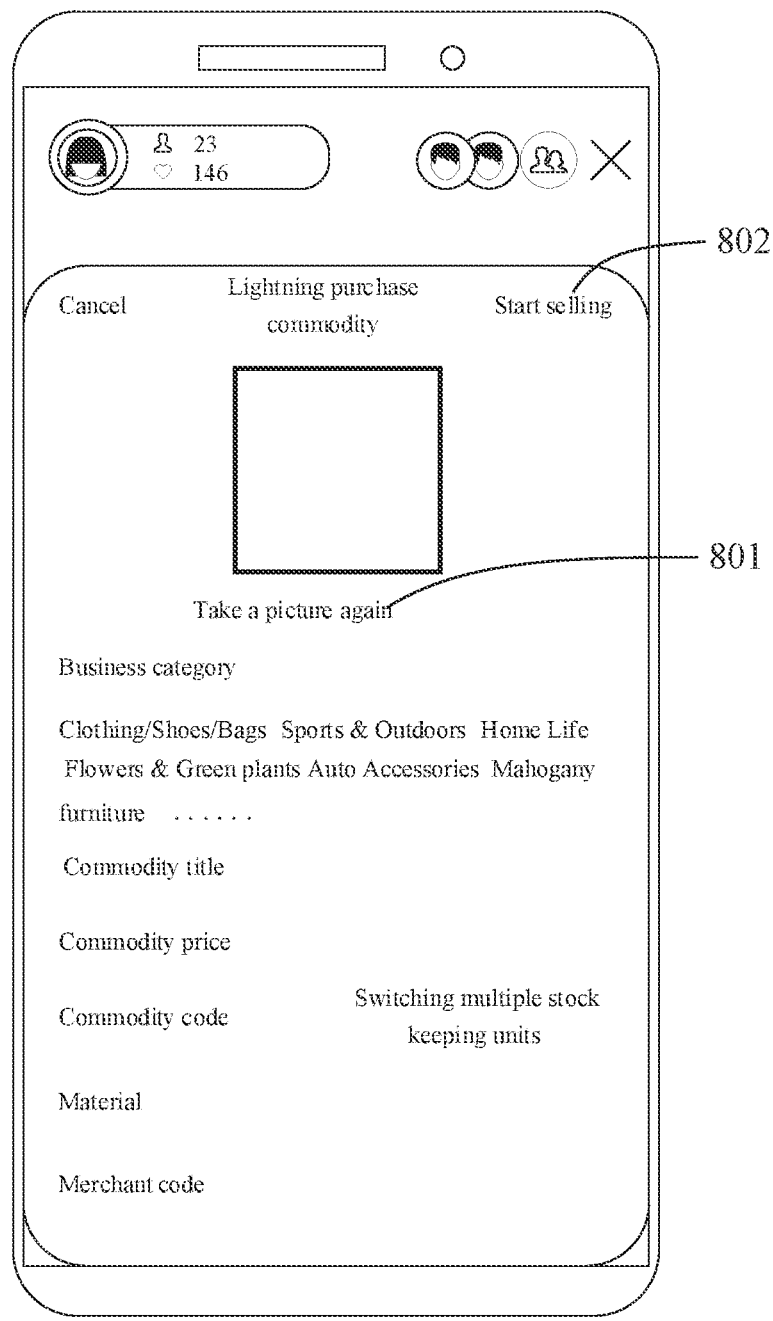
FIG. 8 is a schematic diagram of another article post page according to an exemplary embodiment of the present disclosure.

Optionally, the first terminal displays the re-enter control under a picture area of the screenshot of the live streaming picture. For example, FIG. 8 is a schematic diagram of another article post page according to an exemplary embodiment. Referring to FIG. 8, the re-enter control is a "take a picture again" control 801 shown in FIG. 8. Optionally, the inoperable state may be grayed. Referring to FIG. 8, the inoperable state of the post control is a grayed state of a "start selling" control 802 shown in FIG. 8.

In the above embodiments, the re-enter control for the screenshot of the live streaming picture is displayed in response to a failure of the verification, such that the anchor can perform a re-entering operation for the screenshot of the live streaming picture by triggering the re-enter control, which simplifies the operation process and improves the efficiency of the article post.

In 410, the first terminal updates the screenshot of the live streaming picture in response to the re-entering operation for the screenshot of the live streaming picture based on the re-enter control, and displays the post control in an operable state.

That is, in response to a trigger operation for the re-enter control, the first terminal updates the screenshot of the live streaming picture. After updating the screenshot of the live streaming picture, the post control is switched from an inoperable state into an operable state, such that the anchor account is prompted to post an article object again based on the updated screenshot of the live streaming picture.

In some embodiments, the first terminal automatically captures a current screenshot of the live streaming picture in response to a trigger operation for the re-enter control, and updates the screenshot of the live streaming picture with a latest screenshot of the live streaming picture. Alternatively, in response to a trigger operation for the re-enter control, the first terminal cancels the display of the article post page, captures the screenshot of the live streaming picture in response to the screenshot operation for the live streaming picture of the live streaming room based on anchor account, displays the article post page, and displays the screenshot of the live streaming picture in the article post page.

In the above embodiments, the operating state of the post control is set to further prompt the anchor to re-enter the screenshot of the live streaming picture, which increases the diversity of the display of the article post page.

In the above embodiments, after displaying the verification failure information, the first terminal displays the re-enter control and adjusts the operating state of the post control. In some other embodiments, after displaying the verification failure information, the first terminal does not need to display the re-enter control and adjust the operating state of the post control. That is, after the first terminal performs the process 408, there is no need to perform the process 409 to the process 410.

In 411, the server sends transaction information of the article object to the first terminal and at least one second terminal in the case that the verifying for the screenshot of the live streaming picture is successful, wherein the second terminal is terminal corresponding to an audience account in the live streaming room, and the transaction information is generated based on the article post request.

The transaction information includes a transaction link of the article object. Optionally, the transaction information also includes article information of the article object, such as an article price, an article inventory, an article picture, and the like. In this embodiment, the posted article object is displayed in the live streaming room only in the case that the verifying is successful, such that the security of article transactions can be ensured.

It should be noted that there is at least one audience account in the live streaming room, and the server can send the transaction information of the article object to any of the second terminals corresponding to the audience account.

In 412, the first terminal and the at least one second terminal receive the transaction information of the article object and display the transaction information in the live streaming room in the case that the first terminal and the at least one second terminal receives verification success information, wherein the verification success information is returned by the server based on the article post request.

Figure 9:
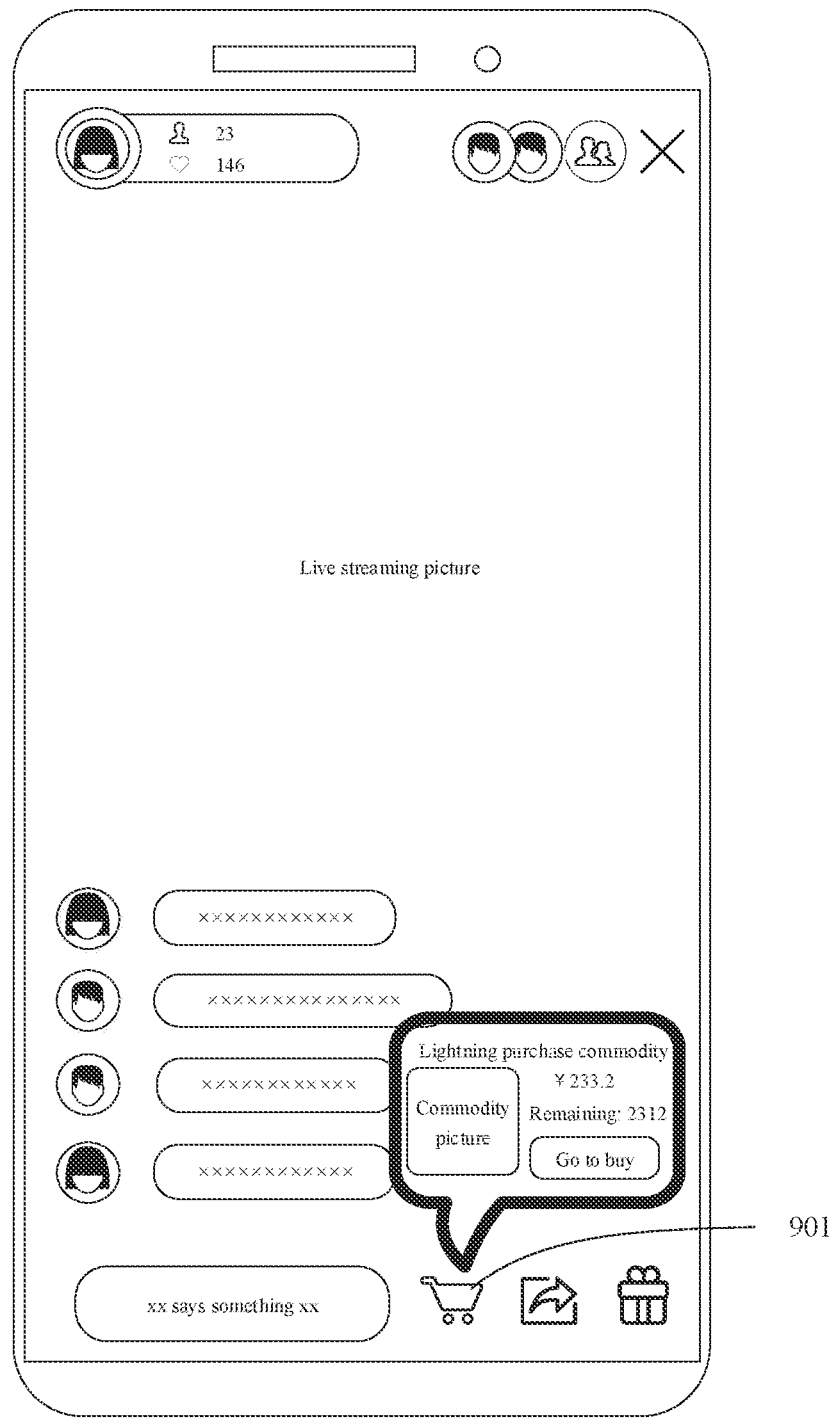
FIG. 9 is a schematic diagram of a live streaming room interface according to an exemplary embodiment of the present disclosure.
Figure 10:
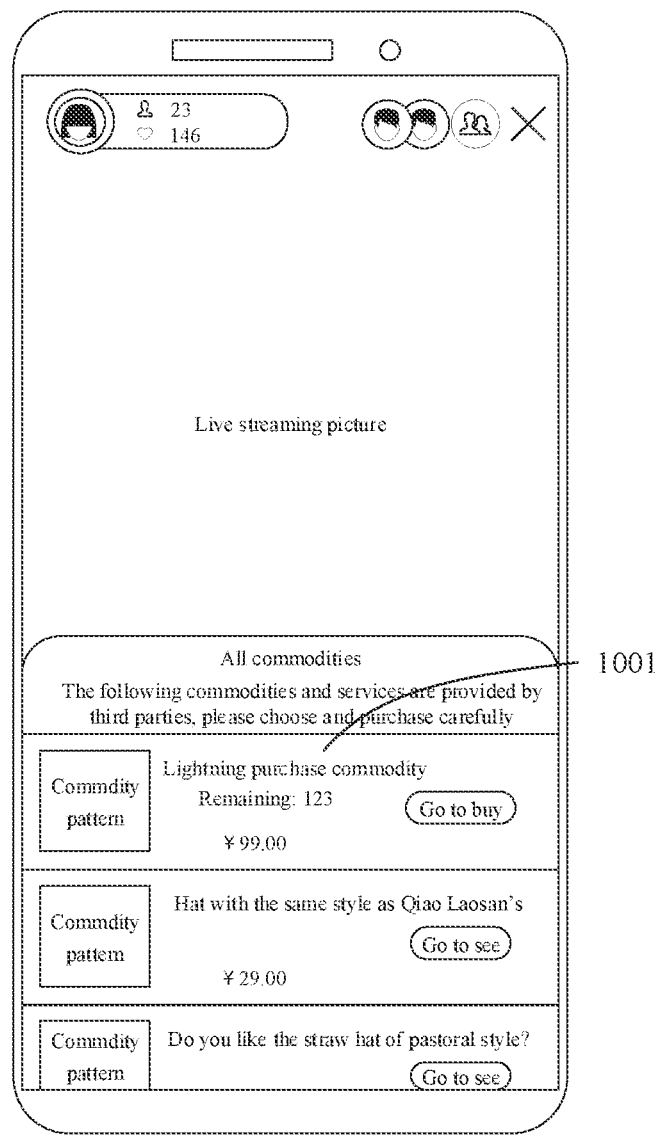
FIG. 10 is a schematic diagram of an article object list according to an exemplary embodiment of the present disclosure.

In some embodiments, the second terminal displays the transaction information of the article object in a target area of the live streaming room. For example, FIG. 9 is a schematic diagram of a live streaming room interface according to an exemplary embodiment. Referring to FIG. 9, a target area is an area where a "shopping cart" control 901 shown in FIG. 9 is located; and the displayed article object is a "lightning purchase commodity" shown in FIG. 9. In some embodiments, the second terminal receives the transaction information of the article object, updates an article object list in the live streaming room, and displays the transaction information of the article object in the article object list. For example, FIG. 10 is a schematic diagram of an article object list according to an exemplary embodiment. Referring to FIG. 10, the displayed article object may be a "lightning purchase commodity" 1001 shown in FIG. 10.

In 413, the at least one second terminal generates a transaction order in response to a transaction operation of an audience account based on the transaction information, and sends the transaction order to the server.

The transaction order refers to an electronic order for the article object.

In some embodiments, any one of the at least one second terminal performs ordering process and payment process in response to the transaction operation of the audience account based on the transaction information, generates a transaction order in response to the successful payment, and sends the transaction order to the server.

In 414, the server receives the transaction order from the at least one second terminal; verifies the article object; and sends related information of the transaction order to the first terminal in the case that the article object meets an article transaction condition, wherein the transaction order is generated based on the transaction information.

The related information of the transaction order indicates information related to an order. For example, the related information includes information such as an audience account, an order number, a consignee, and a delivery address of the purchased article object.

Optionally, the server acquires the transaction order generated based on the transaction information, and triggers a manual review. The staff reviews relevant information of this transaction, for example, information on category or material of the article object. In the case that it is found that the information on category or material is consistent with information set by the anchor (or presented during the live streaming), the server is triggered to send the related information of the transaction order to the first terminal. In this embodiment, the article object is verified again in that the generating process of the transaction order, which ensures that the article object meets the article transaction condition and further ensures the security of article transactions.

In 415, the first terminal receives the related information of the transaction order from the server, wherein the related information is sent by the server based on the transaction order in the case that the server determines that the article object meets the article transaction condition.

In some embodiments, the first terminal receives and displays the related information of the transaction order from the server in the case that the article object meets the article transaction condition, which facilities proceeding to the next operation. In the embodiments, the related information of the transaction order can be received only in the case that the article object meets the article transaction condition, thereby ensuring the security of the article transactions.

The processes 414 to 415 describe the case where the article object meets the article transaction condition. In some other embodiments, the server sends transaction failure information to the first terminal in the case that the article object does not meet the article transaction condition. The first terminal receives and displays the transaction failure information from the server, wherein the transaction failure information indicates that the article object does not meet the article transaction condition. Optionally, the server triggers a manual review, such that the staff reviews relevant information of this transaction, for example, information on category or material of the article object. In the case that it is found that the information on category or material is inconsistent with information set by the anchor for presented during the live streaming), the server is triggered to send the transaction failure information to the first terminal to prompt the anchor account to re-edit the transaction information of the article object.

In some embodiments, the verification failure information is further configured to prompt the anchor account to update the transaction information of the article object. In this embodiment, the anchor account is prompted to update the transaction information of the article object in the case that the article object does not meet the article transaction condition, such that the anchor can proceed to the next operation.

Optionally, the first terminal sends a transaction information updating request to the server in response to a re-editing operation on the transaction information of the article object based on the anchor account, wherein the transaction information updating request is configured to request the server to update the transaction information based on the re-editing operation. The updated transaction information is re-acquired by updating the transaction information through the re-editing operation, which improves the flexibility of information editing.

Optionally, the first terminal sends the transaction information updating request to the server in response to the re-editing operation of the anchor account on the transaction information of the article object within a target duration. Further, the server updates the transaction information of the article object and re-verifies the article object in response to receiving the transaction information updating request from the first terminal within the target duration. In this way, it can be ensured that the subsequent article post process proceeds in order.

Alternatively, the server cancels the transaction order and sends order cancellation information to the second terminal corresponding to the transaction order in response to not receiving the transaction information updating request from the first terminal within the target duration. Optionally, after canceling the transaction order, the server returns a payment paid based on the audience account according to an original payment path. In this embodiment, the transaction order is automatically canceled in the case that the transaction information updating request is not received within period, thereby avoiding transaction errors or unsafe transactions. The target duration is any duration, such as one minute, two minutes, and the like.

In some embodiments, the second terminal displays a verification state of the transaction order on a details page of the transaction order, wherein the verification state includes the verifying being in progress, a failure of the verifying, or a success of the verifying. In this way, the amount of displayed information of the transaction order is increased, which facilitates the audience to know the review condition of the transaction order.

It should be noted that the processes 414 to 415 are optional. In the above embodiments, the server verifies the article object after acquiring the transaction order generated based on the transaction information. In some other embodiments, after acquiring the transaction order generated based on the transaction information, the server performs the subsequent process of the transaction order, without verifying the article object.

Figure 11:
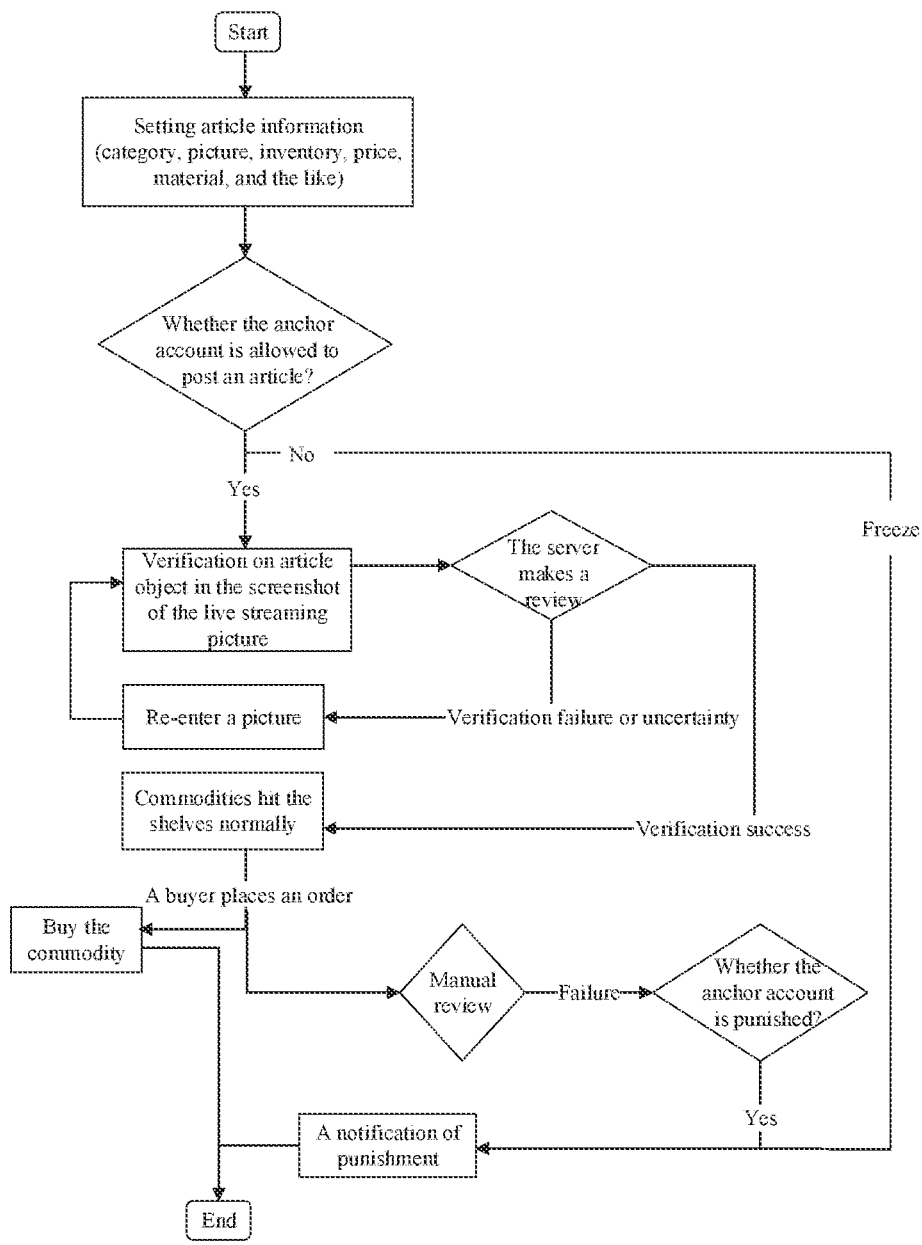
FIG. 11 is a flowchart of a method for processing live streaming data according to an exemplary embodiment of the present disclosure.

Exemplarily, FIG. 11 is a flowchart of a method for processing live streaming data according to an exemplary embodiment. After the anchor sets article information, the server verifies the anchor account to determine whether the anchor account has permission to post an article (that is, whether the anchor account is allowed to post). In the case that the anchor account has no permission to post an article, the server may take actions such as freezing the anchor account, and/or imposing penalties on the anchor account. In the case that the anchor account has the permission to post an article, the server continues to verify the article object in the screenshot of the live streaming picture. In the case that the verifying for the article object fails (or uncertain), the server prompts the anchor account to re-enter a picture; and allows posting the article object in the case that the verifying for the reentered article object is successful. In this case, the audience in the live streaming room can place an order to purchase the article object, and therefore a transaction order is generated. In some embodiment, a manual review on the transaction order is triggered. In response to a failure of the manual review, the anchor account is punished and the audience account corresponding to the transaction order is notified. In response to a success of the manual review, related information of the transaction order is sent to the first terminal, such that the anchor can perform the next process. Through the above processes, the review on the anchor account, the article object, and the post-transacted article object is completed, and at the same time, it is ensured that the anchor can quickly post articles, which reduces the risk of uploading unqualified commodities by the anchor account, improves the quality of the uploaded article object, and ensures the user's shopping experience.

In this embodiment of the present disclosure, prior to posting the screenshot of the live streaming picture, the article object in the screenshot of the live streaming picture is verified to determine whether the article object is allowed to be posted, such that the article object allowed to be posted is posted, and the article object not allowed to be posted is not posted. In this way, it can be ensured that the posted article object is allowed to be posted, and thus the security of subsequent article transactions can be ensured.

Figure 12:
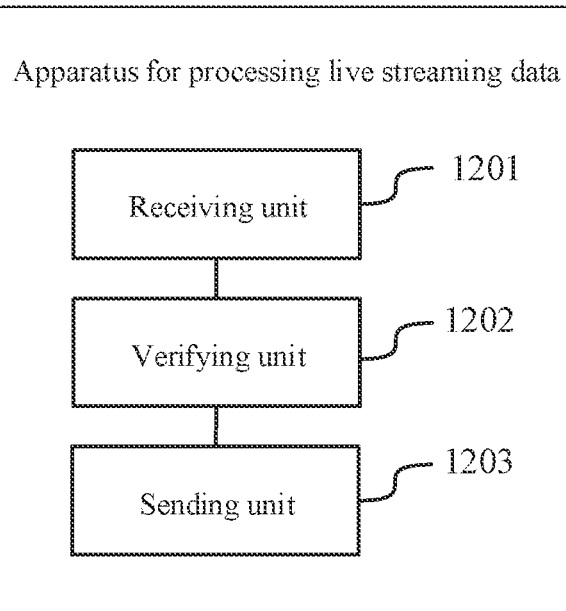
FIG. 12 is a block diagram of an apparatus for processing live streaming data according to an exemplary embodiment of the present disclosure.

FIG. 12 is a block diagram of an apparatus for processing live streaming data according to an exemplary embodiment. Referring to FIG. 12, the apparatus includes a receiving unit 1201, a verifying unit 1202, and a sending unit 1203.

The receiving unit 1201 is configured to receive an article post request from a first terminal, wherein the first terminal is a terminal corresponding to an anchor account, and the article post request carries a screenshot of a live streaming picture in a live streaming room of the anchor account, the screenshot of the live streaming picture comprising an article object.

The verifying unit 1202 is configured to verify the screenshot of the live streaming picture in response to the article post request.

The sending unit 1203 is configured to send verification failure information to the first terminal in response to a failure of the verifying for the screenshot of the live streaming picture, wherein the verification failure information indicates that the article object is not allowed to be posted.

In some embodiments, the verifying unit 1202 includes:

an acquiring sub-unit, configured to acquire a first classification result of the screenshot of the live streaming picture in response to the article post request, wherein the first classification result is configured to indicate whether the article object meets an article object post condition; and a verifying sub-unit, configured to determine that the verifying for the screenshot of the live streaming picture fails in response to the first classification result indicating that the article object does not meet the article object post condition.

In some embodiments, the acquiring sub-unit is configured to:

acquire the first classification result by processing the screenshot of the live streaming picture using a first network model.

In some embodiments, the verifying unit 1202 includes:

an acquiring sub-unit, configured to acquire a second classification result of the screenshot of the live streaming picture in response to the article post request, wherein the second classification result is configured to indicate whether the article object belongs to a target category; and a verifying sub-unit, configured to determine that the verifying for the screenshot of the live streaming picture fails in response to the anchor account not being a first account and the second classification result indicating that the article object belongs to the target category, wherein the first account refers to an account that has a permission to post an article, the permission to post the article being a permission to post an article object under the target category.

In some embodiments, the acquiring sub-unit is configured to:

acquire the second classification result by processing the screenshot of the live streaming picture using a second network model.

In some embodiments, the article post request carries a first article category; and the verifying unit 1202 includes:

an acquiring sub-unit, configured to acquire a third classification result of the screenshot of the live streaming picture in response to the article post request, wherein the third classification result is configured to indicate a second article category to which the article object belongs; and a verifying sub-unit, configured to determine that the verifying for the screenshot of the live streaming picture fails in response to the first article category not matching the second article category.

In some embodiments, the acquiring sub-unit is configured to:

acquire the third classification result by processing the screenshot of the live streaming picture using a third network model.

In some embodiments, the article post request carries the first article category; and the verifying unit 1202 is configured to:

perform a first type of verification among three types of verification in response to the article post request; perform a second type of verification in response to a first verification result indicating that the first verifying is successful; and perform a third type of verification in response to a second verification result indicating that the second verifying fails;

wherein the three types of verification include:

verifying whether the article object meets an article object post condition;

verifying whether the anchor account is a first account and whether an article category of the article object belongs to a target category, wherein the first account refers to an account that has a permission to post an article, the permission to post die article being a permission to post an article object under the target category; and verifying whether the first article category matches the second article category to which the article object belongs.

In some embodiments, the verifying unit 1202 is further configured to:

verify the anchor account based on an account set, wherein the account set comprises a plurality of accounts that have no permission to post an article; determine that the verifying for the anchor account is successful in response to the absence of the anchor account in the account set; and verifying the screenshot of the live streaming picture in response to determining that the verifying for the anchor account is successful.

In some embodiments, the apparatus further includes:

a post unit, configured to send transaction information of the article object to the first terminal and a second terminal in response to a success of the verifying for the screenshot of the live streaming picture, wherein the second terminal is a terminal corresponding to an audience account in the live streaming room, and the transaction information is generated based on the article post request;

an acquiring unit, configured to receive receiving a transaction order from the second terminal and verifying the article object, wherein the transaction order is generated based on the transaction information;

a sending unit, configured to send related information of the transaction order to the first terminal in response to the article object meeting an article transaction condition; and the sending unit, further configured to send transaction failure information to the first terminal in response to the article object not meeting the article transaction condition, wherein the transaction failure information is configured to prompt the anchor account to update the transaction information of the article object.

In some embodiments, the apparatus further includes:

an updating unit, configured to update the transaction information of the article object and re-verify the article object in response to receiving a transaction information updating request from the first terminal within a target duration; or a canceling unit, configured to cancel the transaction order and send order cancellation information to the second terminal corresponding to the transaction order in response to not receiving the transaction information updating request from the first terminal within the target duration.

Figure 13:
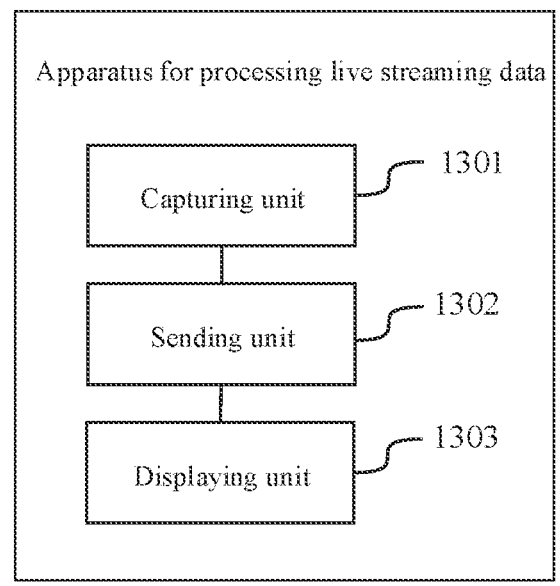
FIG. 13 is a block diagram of an apparatus for processing live streaming data according to an exemplary embodiment of the present disclosure.

FIG. 13 is a block diagram of an apparatus for processing live streaming data according to an exemplary embodiment. Referring to FIG. 13, the apparatus includes a capturing unit 1301, a sending unit 1302, and a displaying unit 1303.

The capturing unit 1301 is configured to capture a screenshot of a live streaming picture in response to a screenshot operation for the live streaming picture of a live streaming room based on an anchor account, wherein the screenshot of the live streaming picture includes an article object.

The sending unit 1302 is configured to send an article post request to the server based on the screenshot of the live streaming picture, wherein the article post request is configured to request a post of the article object in the screenshot of the live streaming picture.

The displaying unit 1303 is configured to display verification failure information in response to receiving the verification failure information, wherein the verification failure information indicates that the article object is not allowed to be posted, and the verification failure information is returned by the server based on the article post request.

In some embodiments, the verification failure information is further configured to prompt re-entering the screenshot of the live streaming picture based on the anchor account; and the apparatus further includes:

a control displaying unit, configured to display a re-enter control for the screenshot of the live streaming picture.

In some embodiments, the apparatus further includes:

a page displaying unit, configured to display an article post page, wherein the article post page includes a post control; and display the screenshot of the live streaming picture.

The control displaying unit, further configured to update the screenshot of the live streaming picture based on the re-enter control in response to a trigger operation for the re-enter control.

In some embodiments, the apparatus further includes:

a page displaying unit, configured to display the re-enter control and a post control on an article post page;

wherein the page displaying unit is further configured to switching the post control from an inoperable state into an operable state after updating the screenshot of the live streaming picture.

In some embodiments, the displaying unit 1303 is further configured to:

display received transaction information of the article object in the live streaming room in response to receiving verification success information, wherein the transaction information is generated by the server based on the article post request, and the verification success information is returned by the server based on the article post request.

In some embodiments, the apparatus further includes:

a receiving unit, configured to receive related information of a transaction order from the server, wherein the related information is sent by the server based on the transaction order in the case that the server determines that the article object meets an article transaction condition, the transaction order is generated by a second terminal based on the transaction information and is sent to the server, and the second terminal is a terminal corresponding to an audience account in the live streaming room.

In some embodiments, the apparatus further includes:

a receiving unit, configured to receive transaction failure information from the server, wherein the transaction failure information is sent by the server based on the transaction order in the case that the server determines that the article object does not meet an article transaction condition, the transaction failure information is configured to prompt the anchor account to update the transaction information of the article object, and the transaction order is generated by a second terminal based on the transaction information and is sent to the server, the second terminal being a terminal corresponding to an audience account in the live streaming room.

In some embodiments, the sending unit 1302 is further configured to:

send a transaction information updating request to the server in response to a re-editing operation of the anchor account for the transaction information of the article object, wherein the transaction information updating request, is configured to request the server to update the transaction information based on the re-editing operation.

Figure 14:
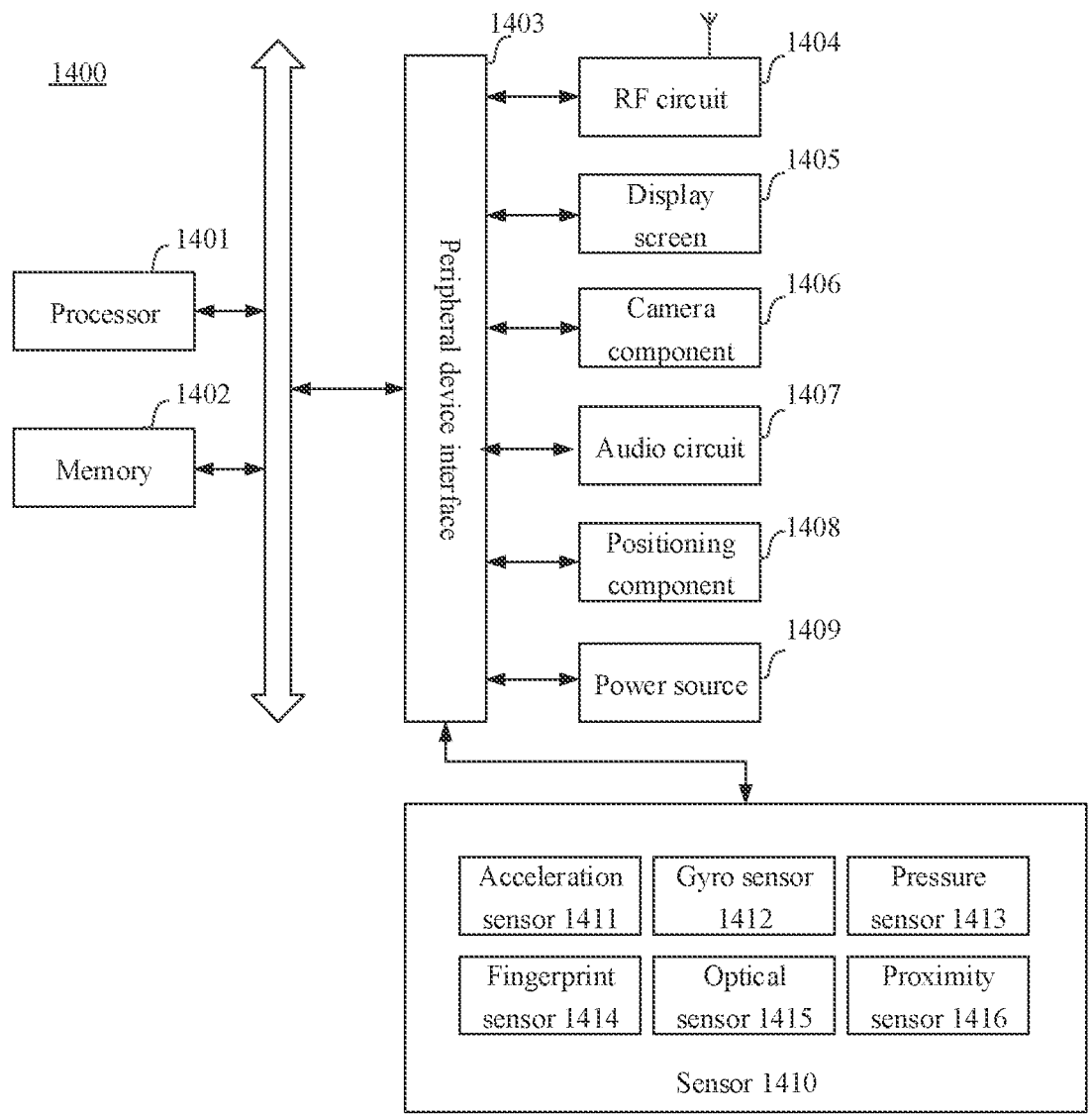
FIG. 14 is a structural block diagram of a terminal according to an exemplary embodiment of the present disclosure.

FIG. 14 is a structural block diagram of a terminal 1400 according to an exemplary embodiment. The terminal 1400 may be a smart phone, a tablet computer, a moving picture experts group audio layer III (MP3) player, a moving picture experts group audio layer IV (MP4) player, a laptop, or a desk computer. The terminal 1400 may also be called user equipment, a portable terminal, a laptop terminal, a desktop terminal, or the like.

Generally, the terminal 1400 includes a processor 1401 and a memory 1402.

The processor 1401 may include one or more processing cores, such as a 4-core processor or an 8-core processor. The processor 1401 may be implemented by at least one hardware of a digital signal processing (DSP), a field-programmable gate array (FPGA), and a programmable logic array (PLA). The processor 1401 may also include a main processor and a coprocessor. The main processor is a processor configured to process the data in an awake state, and is also called a central processing unit (CPU). The coprocessor is a low-power-consumption processor configured to process the data in a standby state. In some embodiments, the processor 1401 may be integrated with a graphics processing unit (GPU), which is configured to render and draw the content that needs to be displayed by a display screen. In some embodiments, the processor 1401 may also include an artificial intelligence (AI) processor configured to process computational operations related to machine learning.

The memory 1402 may include one or more computer-readable storage mediums, which may be non-transitory. The memory 1402 may also include a high-speed random access memory, as well as a non-volatile memory, such as one or more magnetic disk storage devices and flash storage devices. In some embodiments, a non-transitory computer-readable storage medium in the memory 1402 is configured to store one or more instructions therein, wherein the one or more instructions, when loaded and executed by the processor 1401 of an electronic device, cause the electronic device to perform the method for processing live streaming data as defined in the method embodiments of the present disclosure.

In some embodiments, the terminal 1400 may also include a peripheral device interface 1403 and at least one peripheral device. The processor 1401, the memory 1402, and the peripheral device interface 1403 may be connected by a bus or a signal line, Each peripheral device may be connected to the peripheral device interface 1403 by a bus, a signal line, or a circuit board. Specifically, the peripheral device includes at least one of a radio frequency circuit 1404, a display screen 1405, a camera component 1406, an audio circuit 1407, a positioning component 1408, and a power source 1409.

The peripheral device interface 1403 may be configured to connect at least one peripheral device associated with input/output (I/O) to the processor 1401 and the memory 1402. In some embodiments, the processor 1401, the memory 1402, and the peripheral device interface 1403 are integrated on the same chip or circuit board. In some other embodiments, any one or two of the processors 1401, the memory 1402, and the peripheral device interface 1403 may be implemented on a separate chip or circuit board, which is not limited in the present embodiment.

The radio frequency (RF) circuit 1404 is configured to receive and transmit an RF signal, which is also referred to as an electromagnetic signal. The radio frequency circuit 1404 communicates with a communication network and other communication devices via the electromagnetic signal. The RF circuit 1404 converts the electrical signal into the electromagnetic signal for transmission or converts the received electromagnetic signal into the electrical signal. Optionally, the RF circuit 1404 includes an antenna system, an RF transceiver, one or more amplifiers, a tuner, an oscillator, a digital signal processor, a codec chipset, a subscriber identity module card, and the like. The RF circuit 1404 can communicate with other terminals via at least one wireless communication protocol. The wireless communication protocol includes, but is not limited to, a metropolitan area network, various generations of mobile, communication networks (2G, 3G, 4G, and 5G), a wireless local area network, and/or a wireless fidelity (Wi-Fi) network. In some embodiments, the RF circuit 1404 may also include near field communication (NFC) related circuits, which is not limited in the present disclosure.

The display screen 1405 is configured to display a user interface (UI). The UI may include graphics, text, icons, videos, and any combination thereof. In the case that the display screen 1405 is a touch display screen, the display screen 1405 also can acquire touch signals on or over the surface of the display screen 1405. The touch signal may be input into the processor 1401 as a control signal for processing. At this time, the display screen 1405 may also be configured to provide virtual buttons and/or virtual keyboards, which are also referred to as soft buttons and/or soft keyboards. In some embodiments, one display screen 1405 may be disposed on the front panel of the terminal 1400. In some other embodiments, at least two display screens 1405 may be disposed respectively on different surfaces of the terminal 1400 or in a folded design. In some embodiments, the display screen 1405 may be a flexible display screen disposed on a bending or a folded surface of the terminal 1400. Moreover, the display screen 1405 may be defined to an irregular shape other than a rectangle; that is, the display screen 805 may be an irregular-shaped screen. The display screen 1405 may be manufactured by a liquid crystal display (LCD), an organic light-emitting diode (OLED), or the like.

The camera component 1406 is configured to capture images or videos. In some embodiments of the present disclosure, the camera component 1406 includes a front camera and a rear camera. Usually, the front camera is disposed on the front panel of the terminal, and the rear camera is disposed on the back surface of the terminal. In some embodiments, at least two rear cameras are disposed, and are at least one of a main camera, a depth-of-field camera, a wide-angle camera, and a telephoto camera respectively, to achieve a background blurring function by a combination of the main camera and the depth-of-field camera, panoramic shooting and virtual reality (VR) shooting functions by a combination of the main camera and the wide-angle camera or other fusion shooting functions. In some embodiments, the camera component 1406 may further include a flashlight. The flashlight may be a mono-color temperature flashlight or a two-color temperature flashlight. The two-color temperature flash is a combination of a warm flashlight and a cold flashlight and may be used for light compensation at different color temperatures.

The audio circuit 1407 may include a microphone and a speaker. The microphone is configured to acquire sound waves of users and environments, and convert the sound waves into electrical signals which are input into the processor 1401 for processing, or input into the RF circuit 1404 for voice communication. For stereo acquisition or noise reduction, there may be a plurality of microphones respectively disposed at different locations of the terminal 1400. The microphone may also be an array microphone or an omnidirectional acquisition microphone. The speaker is then configured to convert the electrical signals from the processor 1401 or the RF circuit 1404 into the sound waves. The speaker may be a conventional film speaker or a piezoelectric ceramic speaker. In the case that the speaker is the piezoelectric ceramic speaker, the electrical signal may be converted into not only human-audible sound waves but also the sound waves which are inaudible to humans for the purpose of ranging and the like. In some embodiments, the audio circuit 1407 may also include a headphone jack.

The positioning component 1408 is configured to position the current geographic location of the terminal 1400 to implement navigation or location based service (LBS). The positioning component 1408 may be the United States' Global Positioning System (GPS), China's BeiDou Navigation Satellite System (BDS), Russia's Global Navigation Satellite System (GLONASS), or the European Union's Galileo Satellite Navigation System (Galileo).

The power source 1409 is configured to power up various components in the terminal 1400. The power source 1409 may be alternating current, direct current, a disposable battery, or a rechargeable battery. In the case that the power source 1409 includes the rechargeable battery, the rechargeable battery may support wired or wireless charging. The rechargeable battery may also support the fast charging technology.

In some embodiments, the terminal 1400 also includes one or more sensors 1410. The one or more sensors 1410 include, but are not limited to, an acceleration sensor 1411, a gyro sensor 1412, a pressure sensor 1413, a fingerprint sensor 1414, an optical sensor 1415, and a proximity sensor 1416.

The acceleration sensor 1411 may detect magnitudes of accelerations on three coordinate axes of a coordinate system established by the terminal 1400. For example, the acceleration sensor 1411 may be configured to detect components of a gravitational acceleration on the three coordinate axes. The processor 1401 may control the display screen 1405 to display a user interface in a transverse view or a longitudinal view based on a gravity acceleration signal acquired by the acceleration sensor 1411. The acceleration sensor 1411 may also be configured to acquire motion data of a game or a user.

The gyro sensor 1412 can detect a body direction and a rotation angle of the terminal 1400, and can cooperate with the acceleration sensor 1411 to acquire a 3D motion of the user to the terminal 1400. Based on the data acquired by the gyro sensor 1412, the processor 1401 can achieve the following functions: motion sensing (such as changing the UI according to a user's tilt operation), image stabilization during shooting, game control, and inertial navigation.

The pressure sensor 1413 may be disposed on a side frame of the terminal 1400 and/or a lower layer of the display screen 1405. In the case that the pressure sensor 1413 is disposed on the side frame of the terminal 1400, a user's holding signal to the terminal 1400 can be detected. The processor 1401 can perform left-right hand recognition or quick operation according to the holding signal acquired by the pressure sensor 1413. In the case that the pressure sensor 1413 is disposed on the lower layer of the display screen 1405, the processor 1401 controls an operable control on the UI according to a user's press or touch operation on the display screen 1405. The operable control includes at least one of a button control, a scroll bar control, an icon control, and a menu control.

The fingerprint sensor 1414 is configured to acquire a user's fingerprint. The processor 1401 identifies the user's identity based on the fingerprint acquired by the fingerprint sensor 1414, or the fingerprint sensor 1414 identifies the user's identity based on the acquired fingerprint. In the case that the user's identity is identified as trusted, the processor 1401 authorizes the user to perform related sensitive operations, such as unlocking the screen, viewing encrypted information, downloading software, paying, and changing settings. The fingerprint sensor 1414 may be disposed on the front, back, or side of the terminal 1400. In the case that the terminal 1400 is provided with a physical button or a manufacturer's logo, the fingerprint sensor 1414 may be integrated with the physical button or the manufacturer's logo.

The optical sensor 1415 is configured to acquire ambient light intensity. In one embodiment, the processor 1401 may control the display brightness of the display screen 1405 based on the ambient light intensity acquired by the optical sensor 1415. In some embodiments, in the case that the ambient light intensity is higher, the display luminance of the display screen 1405 is increased; and in the case that the ambient light intensity is low, the display luminance of the display screen 1405 is decreased. In some embodiments, the processor 1401 may also dynamically adjust shooting parameters of the camera component 1406 according to the ambient light intensity acquired by the optical sensor 1415.

The proximity sensor 1416, also referred to as a distance sensor, is usually disposed on the front panel of the terminal 1400. The proximity sensor 1416 is configured to acquire a distance between the user and a front surface of the terminal 1400. In some embodiments, in the case that the proximity sensor 1416 detects that the distance between the user and the front surface of the terminal 1400 becomes gradually smaller, the processor 1401 controls the display screen 1405 to switch from a screen-on state to a screen-off state. In response to detecting that the distance between the user and the front surface of the terminal 1400 gradually increases, the processor 1401 controls the display screen 1405 to switch from the screen-off state to the screen-on state.

It should be understood by a person skilled in the art that the structure shown in FIG. 14 does not constitute a limitation to the terminal 1400, and may include more or less components than those illustrated, or combine some components or adopt different component arrangements.

In some embodiments, the terminal includes one or more processors and a memory configured to store one or more instructions executable by the one or more processors; wherein the one or more processors, when loading and executing the one or more instructions, are caused to perform the method for processing live streaming data as defined in the above embodiments.

Figure 15:
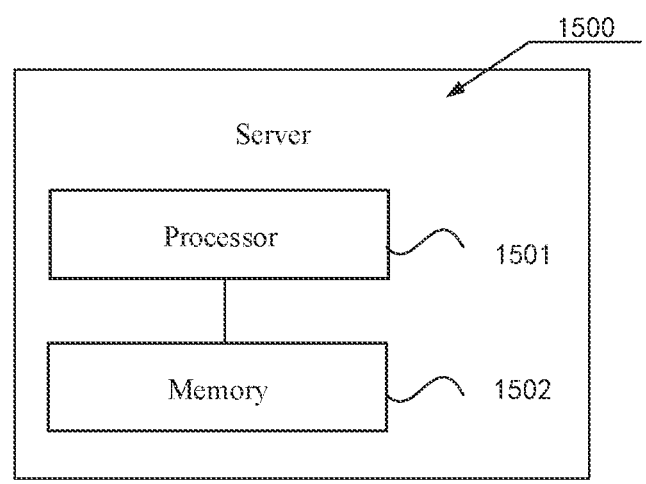
FIG. 15 is a block diagram of a server according to an exemplary embodiment of the present disclosure.

FIG. 15 is a block diagram of a server according to an exemplary embodiment of the present disclosure. The server 1500 may vary greatly depending on different configurations or performances, and may include one or more central processing units (CPUs) 1501 and one or more memories 1502. The one or more memories 1502 are configured to store one or more instructions therein, wherein the one or more instructions, when loaded and executed by the one or more processors 1501, cause the one or more processors to perform the methods for processing live streaming data provided by the above method embodiments. In addition, the server 1500 may also be provided with a wired or wireless network interface, a keyboard, an input/output interface, and other components for input and output. The server 1500 may also include other components configured to implement device functions, which is not described in detail here.

In some embodiments, the server includes one or more processors and a memory configured to store one or more instructions executable by the one or more processors; wherein the one or more processors, when loading and executing the one or more instructions, are caused to perform the method for processing live streaming data as defined in the above embodiments.

In an exemplary embodiment, a non-transitory computer-readable storage medium is provided. The storage medium stores one or more instructions, for example, a memory 1502 storing one or more instructions. The one or more instructions, when loaded and executed by a processor 1501 of a server 1500, cause the server to perform the above-mentioned method for processing live streaming data. Optionally, the computer-readable storage medium may be a read-only memory (ROM), a random access memory (RAM), a compact-disc read-only memory (CD-ROM), a magnetic tape, a floppy disk, an optical data storage device, or the like.

In some embodiments, the one or more instructions stored in the non-transitory computer-readable storage medium, when loaded and executed by one or more processors of the server, causes the server to perform the method for processing live streaming data as defined in the above embodiments. Or, the one or more instructions stored in the non-transitory computer-readable storage medium, when loaded and executed by one or more processors of the terminal, causes the terminal to perform the method for processing live streaming data as defined in the above embodiments.

In an exemplary embodiment, a computer program product is provided. The computer program product stores one or more instructions therein. The one or more instructions, when loaded and executed by a processor of an electronic device, cause the electronic device to perform the method for processing the live streaming data as defined above.

All embodiment of the present disclosure can be implemented alone or in combination with other embodiments, which are deemed to be within the protection scope required by the present disclosure.

What is claimed is:

1. A method for processing live streaming data, applicable to a server, the method comprising:
    receiving an article post request from a first terminal, wherein the first terminal is a terminal corresponding to an anchor account, and the article post request carries a screenshot of a live streaming picture in a live streaming room of the anchor account, the screenshot of the live streaming picture comprising an article object;
    verifying the screenshot of the live streaming picture in response to the article post request; and
    sending verification failure information to the first terminal in response to a failure of the verifying for the screenshot of the live streaming picture, wherein the verification failure information indicates that the article object is not allowed to be posted,
    wherein the method further comprises:
    sending transaction information of the article object to the first terminal and a second terminal hi response to a success of the verifying for the screenshot of the live streaming picture, wherein the second terminal is a terminal corresponding to an audience account in the live streaming room, and the transaction information is generated based on the article post request;

receiving a transaction order from the second terminal and verifying the article object, wherein the transaction order is generated based on the transaction information;

sending related information of the transaction order to the first terminal in response to the article object meeting an article transaction condition; and sending transaction failure information to the first terminal in response to the article object not meeting the article transaction condition, wherein the transaction failure information is configured to prompt the anchor account to update the transaction information of the article object.

2. The method according to claim 1, wherein said verifying the screenshot of the live streaming picture in response to the article post request comprises:

acquiring a first classification result of the screenshot of the live streaming picture in response to the article post request, wherein the first classification result is configured to indicate whether the article object meets an article object post condition; and determining that the verifying for the screenshot of the live streaming picture fails in response to the first classification result indicating that the article object does not meet the article object post condition.

3. The method according to claim 2, wherein said acquiring the first classification result of the screenshot of the live streaming picture comprises:

acquiring the first classification result by processing the screenshot of the live streaming picture using a first network model.

4. The method according to claim 1, wherein said verifying the screenshot of the live streaming picture in response to the article post request comprises:

acquiring a second classification result of the screenshot of the live streaming picture in response to the article post request, wherein the second classification result is configured to indicate whether the article object belongs to a target category; and determining that the verifying for the screenshot of the live streaming picture fails hi response to the anchor account not being a first account and the second classification result indicating that the article object belongs to the target category, wherein the first account refers to an account that has a permission to post an article, the permission to post the article being a permission to post an article object under the target category.

5. The method according to claim 4, wherein said acquiring the second classification result of the screenshot of the live streaming picture comprises:

acquiring the second classification result by processing the screenshot of the live streaming picture using a second network model.

6. The method according to claim 1, wherein the article post request carries a first article category; and said verifying the screenshot of the live streaming picture in response to the article post request comprises:

acquiring a third classification result of the screenshot of the live streaming picture in response to the article post request, wherein the third classification result is configured to indicate a second article category to which the article object belongs; and determining that the verifying for the screenshot of the live streaming picture fads in response to the first article category not matching the second article category.

7. The method according to claim 6, wherein said acquiring the third classification result of the screenshot of the live streaming picture comprises:

acquiring the third classification result by processing the screenshot of the live streaming picture using a third network model.

8. The method according to claim 1, wherein the article post request carries a first article category; and said verifying the screenshot of the live streaming picture in response to the article post request comprises:

performing a first type of verification among three types of verification in response to the article post request; performing a second type of verification in response to a success of the first type of verification; and performing a third type of verification in response to a success of the second type of verification;

wherein the three types of verification comprise:

verifying whether the article object meets an article object post condition;

verifying whether the anchor account is a first account and whether an article category of the article object belongs to a target category, wherein the first account refers to an account that has a permission to post an article, the permission to post the article being a permission to post an article object under the target category; and verifying whether the first article category matches a second article category to which the article object belongs.

9. The method according to claim 1, further comprising:

verifying the anchor account based on an account set, wherein the account set comprises a plurality of accounts that have no permission to post an article;

determining that the verifying for the anchor account is successful in response to the absence of the anchor account in the account set; and verifying the screenshot of the live streaming picture in response to determining that the verifying for the anchor account is successful.

10. The method according to claim 1, further comprising:

in response to receiving a transaction information updating request from the first terminal within a target duration, updating the transaction information of the article object and re-verifying the article object; or in response to not receiving the transaction information updating request from the first terminal within the target duration, canceling the transaction order and sending order cancellation information to the second terminal corresponding to the transaction order.

11. A method for processing live streaming data, applicable to a first terminal, the method comprising:

acquiring a screenshot of a live streaming picture in response to a screenshot operation for a live streaming picture of a live streaming room based on an anchor account, wherein the screenshot of the live streaming picture comprises an article object, and wherein the first terminal is a terminal corresponding to the anchor account;

sending an article post request to a server based on the screenshot of the live streaming picture, wherein the article post request is configured to request a post of the article object in the screenshot of the live streaming picture;

displaying verification failure information in response to receiving the verification failure information, wherein the verification failure information indicates that the article object is not allowed to be posted, and the verification failure information is returned by the server based on the article post request;

receiving transaction information of the article object from the server in response to a success of the verifying for the screenshot of the live streaming picture, and displaying received transaction information of the article object in the live streaming room, and the transaction information is generated by the server based on the article post request, wherein the transaction information is also sent to a second terminal by the server and the second terminal is a terminal corresponding to an audience account hi the live streaming room, and wherein verification success information is returned by the server based on the article post request; and receiving related information of a transaction order, wherein the related information is sent by the server based on the transaction order in response to the article object meeting the article transaction condition, and wherein the transaction order is generated by the second terminal based on the transaction information and sent to the server from the second terminal; and receiving transaction failure information in response to the article object not meeting the article transaction condition, wherein the transaction failure information is configured to prompt the anchor account to update the transaction information of the article object.

12. The method according to claim 11, wherein the verification failure information is further configured to prompt re-entering the screenshot of the live streaming picture based on the anchor account; and the method further comprises:

displaying a re-enter control for the screenshot of the live streaming picture.

13. The method according to claim 12, further comprising:

updating the screenshot of the live streaming picture based on the re-enter control in response to a trigger operation for the re-enter control.

14. The method according to claim 13, further comprising:

displaying the re-enter control and a post control on an article post page; and switching the post control from an inoperable state into an operable state after updating the screenshot of the live streaming picture.

15. The method according to claim 11, further comprising:

sending a transaction information updating request to the server in response to a re-editing operation of the anchor account for the transaction information of the article object, wherein the transaction information updating request is configured to request the server to update the transaction information based on the re-editing operation.

16. A server, comprising:

one or more processors; and a memory configured to store one or more instructions executable by the one or more processors;

wherein the one or more processors, when loading and executing the one or more instructions, are caused to perform the following processes:

receiving an article post request from a first terminal, wherein the first terminal is a terminal corresponding to an anchor account, and the article post request carries a screenshot of a live streaming picture in a live streaming room of the anchor account, the screenshot of the live streaming picture comprising an article object;

verifying the screenshot of the live streaming picture in response to the article post request; and sending verification failure information to the first terminal in response to a failure of the verifying for the screenshot of the live streaming picture, wherein the verification failure information indicates that the article object is not allowed to be posted, wherein the one or more processors, when loading and executing the one or more instructions, are further caused to perform the following processes:

sending transaction information of the article object to the first terminal and a second terminal in response to a success of the verifying for the screenshot of the live streaming picture, wherein the second terminal is a terminal corresponding to an audience account in the live streaming room, and the transaction information is generated based on the article post request;

receiving a transaction order from the second terminal and verifying the article object, wherein the transaction order is generated based on the transaction information;

sending related information of the transaction order to the first terminal in response to the article object meeting an article transaction condition; and sending transaction failure information to the first terminal in response to the article object not meeting the article transaction condition, wherein the transaction failure information is configured to prompt the anchor account to update the transaction information of the article object.

* * * * *